US012389342B2

(12) United States Patent
Liu et al.

(10) Patent No.: US 12,389,342 B2
(45) Date of Patent: Aug. 12, 2025

(54) METHODS, NODES AND COMPUTER READABLE MEDIA FOR PHR

(71) Applicants: Telefonaktiebolaget LM Ericsson (publ), Stockholm (SE); Jinhua Liu, Beijing (CN); Min Wang, Luleå (SE)

(72) Inventors: Jinhua Liu, Beijing (CN); Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 480 days.

(21) Appl. No.: 17/298,960

(22) PCT Filed: Sep. 12, 2019

(86) PCT No.: PCT/CN2019/105637
§ 371 (c)(1),
(2) Date: Jun. 2, 2021

(87) PCT Pub. No.: WO2020/114030
PCT Pub. Date: Jun. 11, 2020

(65) Prior Publication Data
US 2022/0039030 A1 Feb. 3, 2022

(30) Foreign Application Priority Data

Dec. 7, 2018 (WO) ................ PCT/CN2018/119892

(51) Int. Cl.
*H04W 52/36* (2009.01)
*H04W 24/10* (2009.01)
(Continued)

(52) U.S. Cl.
CPC ......... *H04W 52/365* (2013.01); *H04W 24/10* (2013.01); *H04W 52/346* (2013.01); *H04W 52/367* (2013.01); *H04W 80/02* (2013.01)

(58) Field of Classification Search
CPC . H04W 52/365; H04W 24/10; H04W 52/367; H04W 80/02; H04W 52/346
See application file for complete search history.

(56) References Cited

U.S. PATENT DOCUMENTS 9,374,373 B1 * 6/2016 Chan ..................... H04L 9/3247
9,916,538 B2 * 3/2018 Zadeh ..................... A61B 5/165
(Continued)

FOREIGN PATENT DOCUMENTS

CN       102378347 A     3/2012
CN       105282834 A     1/2016
(Continued)

OTHER PUBLICATIONS

EPO Communication with Supplementary European Search Report dated Jul. 28, 2022 for Patent Application No. 19891985.4, consisting of 9-pages.

(Continued)

*Primary Examiner* — Raj Jain
(74) *Attorney, Agent, or Firm* — Weisberg I.P. Law, P.A.

(57) ABSTRACT

The present disclosure provides a method at a downstream radio node. The method includes: determining a mapping table, which indicates a mapping correspondence between an entry index of a PHR related parameter and a measurement value range of the PHR related parameter with an adjustment value being applied; and transmitting an reported entry index according to the mapping table and a corresponding measurement value to an upstream radio node. The present disclosure further provides a method at an upstream radio node, a downstream radio node, an upstream radio node and a computer readable storage medium.

13 Claims, 10 Drawing Sheets

(51) Int. Cl.
*H04W 52/34* (2009.01)
*H04W 80/02* (2009.01)

(56) References Cited

U.S. PATENT DOCUMENTS

| | | | | |
|---|---|---|---|---|
| 10,560,905 | B2* | 2/2020 | Ryoo | H04W 76/18 |
| 2011/0177806 | A1 | 7/2011 | Kazmi et al. | |
| 2013/0215866 | A1* | 8/2013 | Ahn | H04W 52/365 |
| | | | | 370/329 |
| 2015/0003263 | A1* | 1/2015 | Senarath | H04B 7/0686 |
| | | | | 370/252 |
| 2016/0174160 | A1* | 6/2016 | Shen | H04W 52/365 |
| | | | | 455/522 |
| 2018/0206290 | A1 | 7/2018 | Dai | |
| 2022/0039030 | A1* | 2/2022 | Liu | H04W 52/365 |

FOREIGN PATENT DOCUMENTS

| | | |
|---|---|---|
| CN | 106465300 A | 2/2017 |
| CN | 107105495 A | 8/2017 |
| WO | 2012154588 A1 | 11/2012 |
| WO | 2017220635 A1 | 12/2017 |
| WO | 2018202798 A1 | 11/2018 |

OTHER PUBLICATIONS

3GPP TSG-RAN WG2 Meeting#101 R2-1802062; Title: Consideration on PHR granularity enhancements in FeNB-IoT; Agenda Item: 9.13.10; Source: ZTE, Sanechips; Document for: Discussion and Decision: Date and Location: Feb. 26-Mar. 2, 2018, Athens, Greece, consisting of 4-pages.
EPO Communication with Supplementary European Search Report dated Sep. 12, 2022 for Patent Application No. 20744774.9, consisting of 12-pages.
3GPP TSG-RAN WG2 #104 R2-1817459; Title: AS-related group management for platooning; Agenda Item: 11.4.2.3; Source: Huawei, HiSilicon; Document for: Discussion and Decision; Date and Location: Nov. 12-16, 2018, Spokane, USA, consisting of 2-pages.
3GPP TSG-RAN WG2 #104 R2-1818496; Title: Report of [103bis#38] SL unicast/groupcast (LG); Agenda Item: 11.4.2.3; Source: LG (rapporteur); Document for: Discussion and Decision; Date and Location: Nov. 12-16, 2018, Spokane, USA, consisting of 20-pages.
3GPP, "3GPP TS 38.133 V15.3.0", 3rd Generation Partnership Project; Technical Specification Group Radio Access Network; NR; Requirements for support of radio resource management (Release 15), Sep. 2018, 1-136.
3GPP, "3GPP TS 38.213 V15.3.0", 3rd Generation Partnership Project; Technical Specification Group Radio Access Network; NR; Physical layer procedures for control (Release 15), Sep. 2018, 1-101.
3GPP, "3GPP TS 36.133 V15.4.0", 3rd Generation Partnership Project; Technical Specification Group Radio Access Network; Evolved Universal Terrestrial Radio Access (E-UTRA); Requirements for support of radio resource management (Release 15), Sep. 2018, 1-3227.
3GPP, "3rd Generation Partnership Project; Technical Specification Group Radio Access Network; NR; Medium Access Control (MAC) protocol specification (Release 15) 3GPP TS 38.321 V15.3.0", 3GPP TS 38.321 V15.3.0, Sep. 2018, 1-76.
3GPP, "3rd Generation Partnership Project; Technical Specification Group Radio Access Network; NR; Radio Resource Control (RRC) protocol specification (Release 15)", 3GPP TS 38.331 V15.3.0, Sep. 2018, 1-445.
Chinese Office Action with English machine translation dated Nov. 21, 2023 for Patent Application No. 201980076554.0, consisting of 16-pages.
TSG-RAN Working Group 4 (Radio) meeting #86 R4-1802354; Title: Pcmax for FR2 and relation to PHR; Agenda Item: 7.4.9.6; Source: Ericsson; Document for: Approval; Date and Location: Feb. 26-Mar. 2, 2018, Athens, Greece, consisting of 4-pages.

\* cited by examiner

| R | R | PH (Type 1, PCell) |
|---|---|---|
| R | R | $P_{CMAX,f,c}$ |

| C$_7$ | C$_6$ | C$_5$ | C$_4$ | C$_3$ | C$_2$ | C$_1$ | R |
|---|---|---|---|---|---|---|---|
| P | V | \multicolumn{6}{c}{PH (Type 2, SpCell of the other MAC entity)} |
| R | R | \multicolumn{6}{c}{P$_{CMAX,f,c}$ 1} |
| P | V | \multicolumn{6}{c}{PH (Type 1, PCell)} |
| R | R | \multicolumn{6}{c}{P$_{CMAX,f,c}$ 2} |
| P | V | \multicolumn{6}{c}{PH (Type X, Serving Cell 1)} |
| R | R | \multicolumn{6}{c}{P$_{CMAX,f,c}$ 3} |

...

| P | V | PH (Type X, Serving Cell n) |
|---|---|---|
| R | R | P$_{CMAX,f,c}$ m |

FIG. 3(a)

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, SpCell of the other MAC entity) ||||||
| R | R | $P_{CMAX,f,c}$ 1 ||||||
| P | V | PH (Type 1, PCell) ||||||
| R | R | $P_{CMAX,f,c}$ 2 ||||||
| P | V | PH (Type X, Serving Cell 1) ||||||
| R | R | $P_{CMAX,f,c}$ 3 ||||||

...

| P | V | PH (Type X, Serving Cell n) |
|---|---|---|
| R | R | $P_{CMAX,f,c}$ m |

FIG. 3(b)

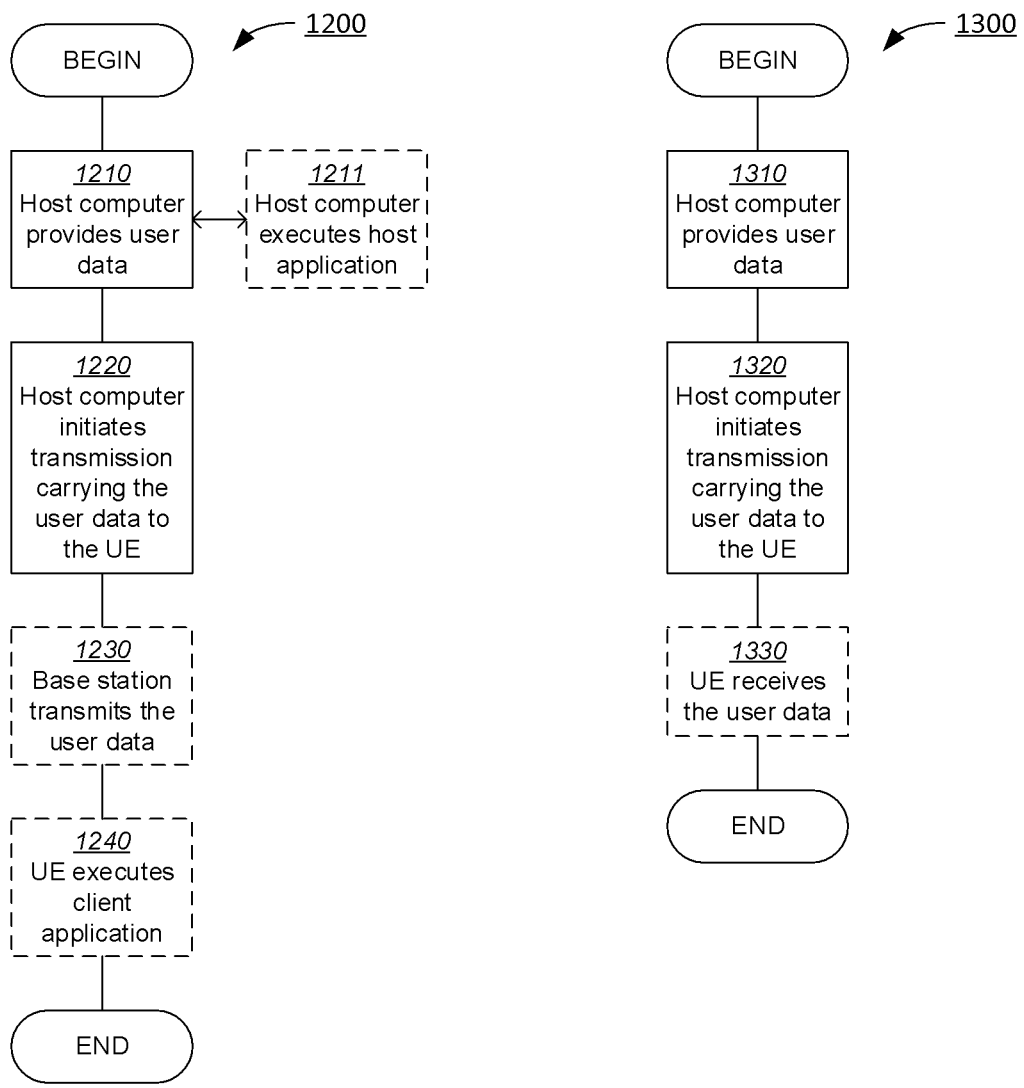
FIG. 12                     FIG. 13

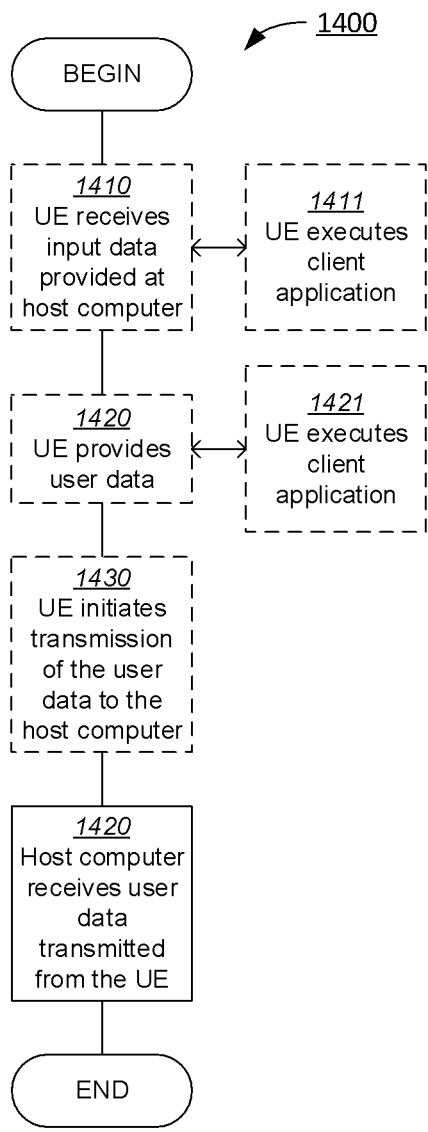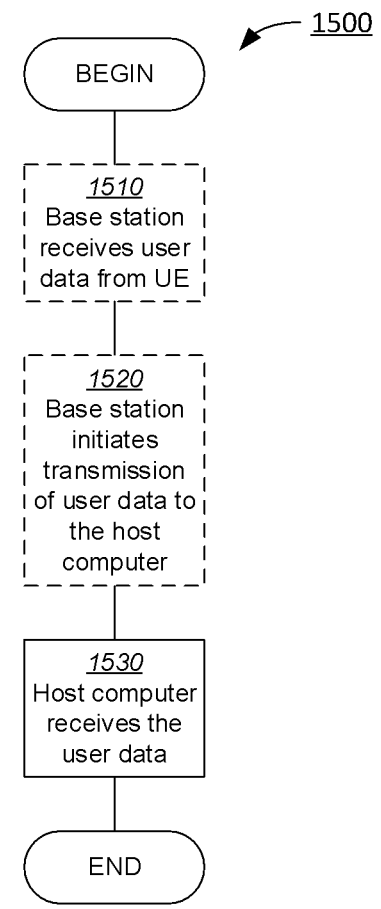
FIG. 14                    FIG. 15

METHODS, NODES AND COMPUTER READABLE MEDIA FOR PHR

TECHNICAL FIELD

The present disclosure generally relates to the technical field of communications, and particularly to methods at nodes in an Integrated Access Backhaul (IAB) network respectively for Power Headroom Report (PHR), corresponding nodes and computer readable media.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

IAB is being studied in 3GPP. In Rel. 16, the IAB has been approved as a study item. For an NR system capable of IAB, an access point can setup a radio connection to another access point in order to reach a donor access point which has a wireline backhaul, wherein the access points are referred to as IAB Nodes (referred to as IAB-Ns). The radio connection between the IAB-Ns is referred to as a wireless backhaul or self-backhaul. FIG. 1 schematically shows a basic system structure of such an IAB network. The donor IAB-N (IAB-N x) has a cable backhaul to the gateway, IAB-N y acts as a bridge node between IAB-N x and IAB-N z, where IAB-N y is referred to as a parent IAB-N of IAB-N z, and IAB-N z is referred to as a child IAB-N of IAB-N y. In another branch, IAB-N k is connected to IAB-N j, and IAB-N j is connected to IAB-N x. Each IAB-N may also have UEs connected thereto.

For an IAB network, there may be three types of links:
 an upstream link to/from the parent IAB-N;
 a downstream link to/from the child IAB-N;
 a number of downlink/uplink access links to the served UEs; The first two types of links are also referred to as backhaul links.

In the IAB network, an IAB-N may be scheduled by its parent IAB-N, and also, this IAB-N may also schedule the connected UEs or its child IAB-Ns. A PHR should still be used to facilitate the uplink scheduling in the IAB network.

In Rel. 15, the PHR is used to indicate the available power resources for uplink transmission of a UE. The PHR can be triggered in preconfigured conditions, such as a downlink path loss change exceeding a preconfigured threshold or activation of a serving cell. The triggering procedures are defined in 3GPP TS 38.321 V15.3.0, which is incorporated herein by reference.

When a PHR is triggered for a serving cell, a UE shall estimate a PH (power headroom) for the serving cell according to schemes provided in Section 7 of 3GPP TS 38.213 V15.3.0, which is incorporated herein by reference. There are three types of PHs and each one is calculated by comparing a maximum UE transmit power and a transmit power of a certain uplink transmission. When a PH is derived, the PH and the UE maximum transmit power should be quantized according to Table 1 (a PH mapping table) and Table 2 (a Maximum Transmit Power mapping table) as listed below, respectively corresponding to Tables 10.1.17.1-1 and 10.1.18.1-1 in Section 10.1 of 3GPP TS 38.133 V15.3.0, which is incorporated herein by reference. For Table 1, there are 64 entries and the granularity is 1 or 2 dB. For Table 2, there are also 64 entries and the granularity is 1 dB.

TABLE 1

PH Mapping

| Reported value | Measured quantity value (dB) |
| --- | --- |
| POWER_HEADROOM_0 | PH < −32 |
| POWER_HEADROOM_1 | −32 ≤ PH < −31 |
| POWER_HEADROOM_2 | −31 ≤ PH < −30 |
| POWER_HEADROOM_3 | −30 ≤ PH < −29 |
| ... | ... |
| POWER_HEADROOM_53 | 25 ≤ PH < 26 |
| POWER_HEADROOM_54 | 26 ≤ PH < 27 |
| POWER_HEADROOM_55 | 27 ≤ PH < 28 |
| POWER_HEADROOM_56 | 28 ≤ PH < 30 |
| POWER_HEADROOM_57 | 30 ≤ PH < 32 |
| POWER_HEADROOM_58 | 32 ≤ PH < 34 |
| POWER_HEADROOM_59 | 34 ≤ PH < 36 |
| POWER_HEADROOM_60 | 36 ≤ PH < 38 |
| POWER_HEADROOM_61 | 38 ≤ PH < 40 |
| POWER_HEADROOM_62 | 40 ≤ PH < 42 |
| POWER_HEADROOM_63 | PH ≥ 42 |

TABLE 2

Maximum Transmit Power ($P_{CMAX, c, f}$) Mapping

| Reported value | Measured quantity value | Unit |
| --- | --- | --- |
| PCMAX_C_00 | $P_{CMAX, c, f} < -29$ | dBm |
| PCMAX_C_01 | $-29 \leq P_{CMAX, c, f} < -28$ | dBm |
| PCMAX_C_02 | $-28 \leq P_{CMAX, c, f} < -27$ | dBm |
| ... | ... | ... |
| PCMAX_C_61 | $31 \leq P_{CMAX, c, f} < 32$ | dBm |
| PCMAX_C_62 | $32 \leq P_{CMAX, c, f} < 33$ | dBm |
| PCMAX_C_63 | $33 \leq P_{CMAX, c, f}$ | dBm |

For data transmission between the IAB-Ns, two factors may be considered compared to the uplink transmission from a UE to a network node:
 One is that the allowed maximum uplink transmit power may be much higher than that of a UE, since a Specific Absorption Rate (SAR) restriction may not be applicable for an IAB-N.
 The other is that the total beamforming gain (i.e. Tx beamforming gain plus RX beam forming gain) of an uplink backhaul radio link may be much higher than that of an uplink radio link from a UE to a network node, which means that the range of power headroom for a backhaul link could be much wider than a uplink radio link from the UE to the network node. That is because:
   The antenna panel size of a child IAB-N is much larger than that of a UE;
   The number of transmit antenna elements of a child IAB-N could be much more than that of a UE;
   The beamforming training effect may be much better than a mobile UE since the child IAB-N is static, finer beamforming training and fewer beam switches are triggered.

Considering above factors, the existing tables related to PHR, including the table for power headroom room level and the table for the nominal UE transmit power level may be insufficient to support PHR for a backhaul link.

SUMMARY

In order to better fit with the requirements of the higher transmission power class and the beamforming gain for the IAB-N, the present disclosure proposes a method at a downstream radio node, a downstream radio node, a method at an upstream radio node, an upstream radio node, and corresponding computer readable media.

According to a first aspect of the present disclosure, a method at a downstream radio node is provided. The method includes: determining a mapping table, which indicates a mapping correspondence between an entry index of a PHR related parameter and a measurement value range of the PHR related parameter with an adjustment value being applied; and transmitting a reported entry index according to the mapping table and a corresponding measurement value to an upstream radio node.

In an exemplary embodiment, the reported entry index is transmitted in a PHR MAC CE (Media Access Control Control Element).

In an exemplary embodiment, the PHR related parameter includes at least one of a PH (Power Headroom) and a maximum transmit power for the downstream radio node.

In an exemplary embodiment, the adjustment value is configured by the upstream radio node or a donor radio node or predefined.

In an exemplary embodiment, the adjustment value is one of:
an offset of a measurement value of the PHR related parameter;
a maximum value of a measurement value of the PHR related parameter;
a minimum value of a measurement value of the PHR related parameter.

In an exemplary embodiment, in a case that the adjustment value is the maximum or minimum value of the measurement value of the PHR related parameter, said determining the mapping table includes:
determining the mapping table at least based on the maximum or minimum value and a granularity value which is configured by the upstream radio node or a donor radio node or predefined.

In an exemplary embodiment, the measurement value range of the PHR related parameter with the adjustment value being applied is one of:

$$\begin{cases} (-\infty, \text{Min}), & \text{if } n = 0 \\ [\text{Min} + (n-1)*Gn, \text{Min} + n*Gn), & \text{if } n = 1 \sim (N-2) \\ [\text{Min} + (N-2)*Gn, +\infty), & \text{if } n = (N-1) \end{cases}$$

$$\begin{cases} (-\infty, \text{Max} - (N-2)*Gn), & \text{if } n = 0 \\ [\text{Max} - (N-n-1)*Gn, \text{Max} - (N-n-2)*Gn), & \text{if } n = 1 \sim (N-2) \\ [\text{Max} + \infty), & \text{if } n = (N-1) \end{cases}$$

wherein n denotes an entry index, N is a number of entry indexes and is an integer; Min denotes the minimum value; Max denotes the maximum value; and Gn denotes the granularity value corresponding to the entry index n.

In an exemplary embodiment, the granularity value is a predetermined value.

In an exemplary embodiment, the granularity value is derived based on the number of the entry indexes, the minimum value and the maximum value.

In an exemplary embodiment, the granularity value is entry index specific.

In an exemplary embodiment, in a case that there are a plurality of mapping tables for one PHR related parameter, said determining the mapping table includes:

determining one of the plurality of mapping tables to be used according to a maximum transmit power of the downstream radio node, or configuration from the upstream radio node or a donor radio node, or a type of the downstream radio node.

In an exemplary embodiment, the method further includes: indicating, to the upstream radio node, the determined mapping table for one of the PH and the maximum transmit power by reserved bits in a field for another of the PH and the maximum transmit power in a PHR MAC CE or in a MAC subheader.

In an exemplary embodiment, in a case that there are a plurality of mapping tables for one PHR related parameter and each mapping table is corresponding to at least one of a plurality of granularity values, the method further includes:

selecting a granularity value from the plurality of granularity values, and indicating, to the upstream radio node, the selected granularity value and/or its corresponding mapping table for one of the PH and the maximum transmit power by reserved bits in a field for another of the PH and the maximum transmit power in a PHR MAC CE or in a MAC subheader.

In an exemplary embodiment, a field for one of the PH and the maximum transmit power in a PHR MAC CE is extended by incorporating at least one reserved bit from a field for another one of the PH and the maximum transmit power.

In an exemplary embodiment, the downstream radio node includes at least one of: a UE, and a downstream IAB-N.

According to a second aspect of the present disclosure, a downstream radio node is provided. The downstream radio node includes: at least one processor; and at least one memory, storing instructions which, when executed on the at least one processor, cause the at least one processor to perform the method according to the first aspect of the present disclosure.

According to a third aspect of the present disclosure, a computer readable storage medium having computer program instructions stored thereon, the computer program instructions, when executed by at least one processor in a radio node, causing the at least one processor to perform the method according to the first aspect of the present disclosure.

According to a fourth aspect of the present disclosure, a method at an upstream radio node is provided. The method includes: determining a mapping table, which indicates a mapping correspondence between an entry index of a PHR related parameter and a measurement value range of the PHR related parameter with an adjustment value being applied; receiving a reported entry index from a downstream radio node; and obtaining a corresponding measurement value range according to the determined mapping table and the reported entry index.

In an exemplary embodiment, the reported entry index is received in a PHR MAC CE.

In an exemplary embodiment, the PHR related parameter includes at least one of a Power Headroom, PH, and a maximum transmit power for the downstream radio node.

In an exemplary embodiment, the adjustment value is configured by the upstream radio node or a donor radio node or predefined.

In an exemplary embodiment, the adjustment value is one of:
an offset of a measurement value of the PHR related parameter;

a maximum value of a measurement value of the PHR related parameter;

a minimum value of a measurement value of the PHR related parameter.

In an exemplary embodiment, in a case that the adjustment value is the maximum or minimum value of the measurement value of the PHR related parameter, said determining the mapping table includes: determining the mapping table at least based on the maximum or minimum value and a granularity value which is configured by the upstream radio node or a donor radio node or predefined.

In an exemplary embodiment, the measurement value range of the PHR related parameter with the adjustment value being applied is one of:

$$\begin{cases} (-\infty, \text{Min}), & \text{if } n = 0 \\ [\text{Min} + (n-1)*Gn, \text{Min} + n*Gn), & \text{if } n = 1 \sim (N-2) \; ; \\ [\text{Min} + (N-2)*Gn, +\infty), & \text{if } n = (N-1) \end{cases}$$

$$\begin{cases} (-\infty, \text{Max} - (N-2)*Gn), & \text{if } n = 0 \\ [\text{Max} - (N-n-1)*Gn, \text{Max} - (N-n-2)*Gn), & \text{if } n = 1 \sim (N-2) \, , \\ [\text{Max} + \infty), & \text{if } n = (N-1) \end{cases}$$

wherein n denotes an entry index, N is a number of entry indexes and is an integer; Min denotes the minimum value; Max denotes the maximum value; and Gn denotes the granularity value corresponding to the entry index n.

In an exemplary embodiment, the granularity value is a predetermined value.

In an exemplary embodiment, the granularity value is derived based on the number of the entry indexes, the minimum value and the maximum value.

In an exemplary embodiment, the granularity value is entry index specific.

In an exemplary embodiment, in a case that there are a plurality of mapping tables for one PHR related parameter, said determining the mapping table includes:

determining one of the plurality of mapping tables to be used according to a maximum transmit power of the downstream radio node, or configuration from the upstream radio node or a donor radio node, or a type of the downstream radio node.

In an exemplary embodiment, the method further includes: receiving, from the downstream radio node, an indication of the mapping table for one of the PH and the maximum transmit power determined by the downstream radio node, which is indicated by reserved bits in a field for another of the PH and the maximum transmit power in a PHR MAC CE or in a MAC subheader.

In an exemplary embodiment, in a case that there are a plurality of mapping tables for one PHR related parameter and each mapping table is corresponding to at least one of a plurality of granularity values, the method further includes: receiving, from the downstream radio node, an indication of the granularity value and/or its corresponding mapping table for one of the PH and the maximum transmit power determined by the downstream radio node, which is indicated by reserved bits in a field for another of the PH and the maximum transmit power in a PHR MAC CE or in a MAC subheader.

In an exemplary embodiment, a field for one of the PH and the maximum transmit power in a PHR MAC CE is extended by incorporating at least one reserved bit from a field for another one of the PH and the maximum transmit power.

According to a fifth aspect of the present disclosure, an upstream radio node is provided. The upstream radio node includes: at least one processor; and at least one memory, storing instructions which, when executed on the at least one processor, cause the at least one processor to perform the method according to the fourth aspect of the present disclosure.

According to sixth aspect of the present disclosure, a computer readable storage medium having computer program instructions stored thereon, the computer program instructions, when executed by at least one processor in a radio node, causing the at least one processor to perform the method according to the first or fourth aspect of the present disclosure.

According to a seventh aspect of the present disclosure, a communication system is provided. The communication system includes a host computer including: processing circuitry configured to provide user data; and a communication interface configured to forward the user data to a cellular network for transmission to a UE. The cellular network includes a base station, a transmission point, relay node, an IAB node or an UE having a radio interface and processing circuitry. The base station's processing circuitry is configured to perform the method according to the first or fourth aspect of the present disclosure.

In an exemplary embodiment, the communication system can further include the base station.

In an exemplary embodiment, the communication system can further include the UE. The UE is configured to communicate with the base station.

In an exemplary embodiment, the processing circuitry of the host computer can be configured to execute a host application, thereby providing the user data. The UE can include processing circuitry configured to execute a client application associated with the host application.

According to an eighth aspect of the present disclosure, a method is provided. The method is implemented in a communication system including a host computer, a base station and a UE. The method includes: at the host computer, providing user data; and at the host computer, initiating a transmission carrying the user data to the UE via a cellular network comprising the base station. The base station can perform the method according to the first aspect of the present disclosure.

In an exemplary embodiment, the method further can include: at the base station, transmitting the user data.

In an exemplary embodiment, the user data can be provided at the host computer by executing a host application. The method can further include: at the UE, executing a client application associated with the host application.

According to a ninth aspect of the present disclosure, a communication system is provided. The communication system includes a host computer including: processing circuitry configured to provide user data; and a communication interface configured to forward user data to a cellular network for transmission to a UE. The UE includes a radio interface and processing circuitry. The UE's processing circuitry is configured to perform the method according to the first aspect of the present disclosure.

In an exemplary embodiment, the communication system can further include the UE.

In an exemplary embodiment, the cellular network can further include a base station configured to communicate with the UE.

In an exemplary embodiment, the processing circuitry of the host computer can be configured to execute a host application, thereby providing the user data. The UE's processing circuitry can be configured to execute a client application associated with the host application.

According to a tenth aspect of the present disclosure, a method is provided. The method is implemented in a communication system including a host computer, a base station and a UE. The method includes: at the host computer, providing user data; and at the host computer, initiating a transmission carrying the user data to the UE via a cellular network comprising the base station. The UE can perform the method according to the fourth aspect of the present disclosure.

In an exemplary embodiment, the method can further include: at the UE, receiving the user data from the base station.

According to an eleventh aspect of the present disclosure, a communication system is provided. The communication system includes a host computer including: a communication interface configured to receive user data originating from a transmission from a UE to a base station. The UE includes a radio interface and processing circuitry. The UE's processing circuitry is configured to: perform the method according to the first aspect of the present disclosure.

In an exemplary embodiment, the communication system can further include the UE.

In an exemplary embodiment, the communication system can further include the base station. The base station can include a radio interface configured to communicate with the UE and a communication interface configured to forward to the host computer the user data carried by a transmission from the UE to the base station.

In an exemplary embodiment, the processing circuitry of the host computer can be configured to execute a host application. The UE's processing circuitry can be configured to execute a client application associated with the host application, thereby providing the user data.

In an exemplary embodiment, the processing circuitry of the host computer can be configured to execute a host application, thereby providing request data. The UE's processing circuitry can be configured to execute a client application associated with the host application, thereby providing the user data in response to the request data.

According to a twelfth aspect of the present disclosure, a method is provided. The method is implemented in a communication system including a host computer, a base station and a UE. The method includes: at the host computer, receiving user data transmitted to the base station from the UE. The UE can perform the method according to the first aspect of the present disclosure.

In an exemplary embodiment, the method can further include: at the UE, providing the user data to the base station.

In an exemplary embodiment, the method can further include: at the UE, executing a client application, thereby providing the user data to be transmitted; and at the host computer, executing a host application associated with the client application.

In an exemplary embodiment, the method can further include: at the UE, executing a client application; and at the UE, receiving input data to the client application, the input data being provided at the host computer by executing a host application associated with the client application. The user data to be transmitted is provided by the client application in response to the input data.

According to a thirteenth aspect of the present disclosure, a communication system is provided. The communication system includes a host computer including a communication interface configured to receive user data originating from a transmission from a UE to a base station. The base station includes a radio interface and processing circuitry. The base station's processing circuitry is configured to perform the method according to the first or fourth aspect of the present disclosure.

In an exemplary embodiment, the communication system can further include the base station.

In an exemplary embodiment, the communication system can further include the UE. The UE can be configured to communicate with the base station.

In an exemplary embodiment, the processing circuitry of the host computer can be configured to execute a host application; the UE can be configured to execute a client application associated with the host application, thereby providing the user data to be received by the host computer.

According to a fourteenth aspect of the present disclosure, a method is provided. The method is implemented in a communication system including a host computer, a base station and a UE. The method includes: at the host computer, receiving, from the base station, user data originating from a transmission which the base station has received from the UE. The base station can perform the method according to the first or fourth aspect of the present disclosure.

In an exemplary embodiment, the method can further include: at the base station, receiving the user data from the UE.

In an exemplary embodiment, the method can further include: at the base station, initiating a transmission of the received user data to the host computer.

According to the embodiments of the present disclosure, the measurement value range of the PHR related parameter in the mapping table has an adjustment value applied, so that the measurement value range of the PHR related parameter, such as the PH, the maximum transmit power, in the mapping table may fit with the requirements of the higher transmission power class and the beamforming gain for the IAB-N. Accordingly, the field for the PHR related parameter in the PHR MAC CE for transmitting a reported entry index corresponding to a measurement value of the PHR related parameter is improved.

BRIEF DESCRIPTION OF THE DRAWINGS

The objects, advantages and characteristics of the present disclosure will be more apparent, according to descriptions of preferred embodiments in connection with the drawings, in which:

FIG. 3(a) schematically shows a format of multiple entry PHR MAC CE with the highest ServCellIndex of Serving Cell with configured uplink is less than 8;

FIG. 3(b) schematically shows a format of multiple entry PHR MAC CE with the highest ServCellIndex of Serving Cell with configured uplink is equal to or higher than 8;

FIGS. 12 to 15 are flowcharts illustrating methods implemented in a communication system including a host computer, a base station and a UE.

Figures 1, 2:
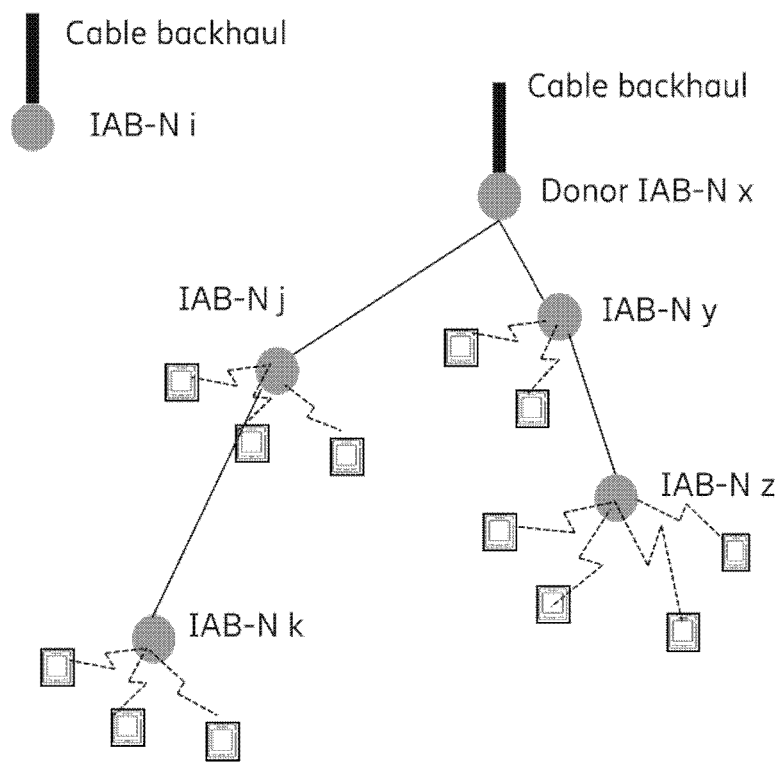
FIG. 1 schematically shows a basic system structure of such an IAB network.
FIG. 2 schematically shows a format of a single entry PHR MAC CE.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. The techniques described herein may be used for various wireless communication networks such as CDMA, TDMA, FDMA, OFDMA, SC-FDMA, LTE and other networks developed in the future. The terms "network" and "system" are often used interchangeably. For illustration only, certain aspects of the techniques are described below for the next, i.e. the $5^{th}$ generation of wireless communication network, such as NR. However, it will be appreciated by the skilled in the art that the techniques described herein may also be used for other wireless networks such as LTE and corresponding radio technologies mentioned herein as well as wireless networks and radio technologies proposed in the future.

As used herein, the term "network node" refers to a device in a wireless communication network via which a terminal device or another network node accesses the network and receives services therefrom. The network node refers to a base station (BS), an access point (AP), an IAB-N or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network node may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network node may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, UE (user equipment), or other suitable devices. The UE may be, for example, a SS (Subscriber Station), a Portable Subscriber Station, a MS (Mobile Station), or an AT (Access Terminal), a relay node, an IAB-N. The terminal device may include, but not limited to, portable computers, image capture terminal devices such as digital cameras, gaming terminal devices, music storage and playback appliances, a mobile phone, a cellular phone, a smart phone, VoIP (voice over IP) phones, wireless local loop phones, a tablet, a wearable device, a PDA (personal digital assistant), portable computers, desktop computer, image capture terminal devices such as digital cameras, gaming terminal devices, music storage and playback appliances, wearable terminal devices, vehicle-mounted wireless terminal devices, wireless endpoints, mobile stations, LEE (laptop-embedded equipment), LME (laptop-mounted equipment), USB dongles, smart devices, wireless CPE (customer-premises equipment) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an IOT (Internet of Things) scenario, a terminal device may represent a machine or other device that performs monitoring and/or measurements, and transmits the results of such monitoring and/or measurements to another terminal device and/or network equipment. The terminal device may in this case be a M2M (machine-to-machine) device, which may in a 3GPP context be referred to as a MTC device. As one particular example, the terminal device may be a UE implementing the 3GPP NB-IoT standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

The term "radio node" refers to a network node or a terminal device as described previously.

As used herein, a downlink, DL transmission refers to a transmission from the network node to a terminal device, and an uplink, UL transmission refers to a transmission in an opposite direction.

As used herein, a downstream link refers to a transmission from an upstream radio node, such as a parent IAB-N, to a downstream radio node, such as a child IAB-N, a terminal device; and an upstream link refers to a transmission from the downstream radio node to the upstream radio node.

As used herein, a donor radio node specifically refers to an upstream radio node having a wireline backhaul, i.e., a root IAB-N.

As used herein, the term "and/or" includes any and all combinations of one or more of the associated listed terms.

In the following description and claims, unless defined otherwise, all technical and scientific terms used herein have the same meaning as commonly understood by one of ordinary skills in the art to which this disclosure belongs.

It will be appreciated that although the embodiments of the present disclosure are exemplified to be applied to the IAB network in order to better fit with the requirements of the higher transmission power class and the beamforming gain for the IAB-N, the basic idea of the present disclosure is also applicable to a non-IAB network.

Hereinafter, a method at a downstream radio node for PHR according to an exemplary embodiment of the present disclosure will be described with reference to FIG. 2.

Figure 4:
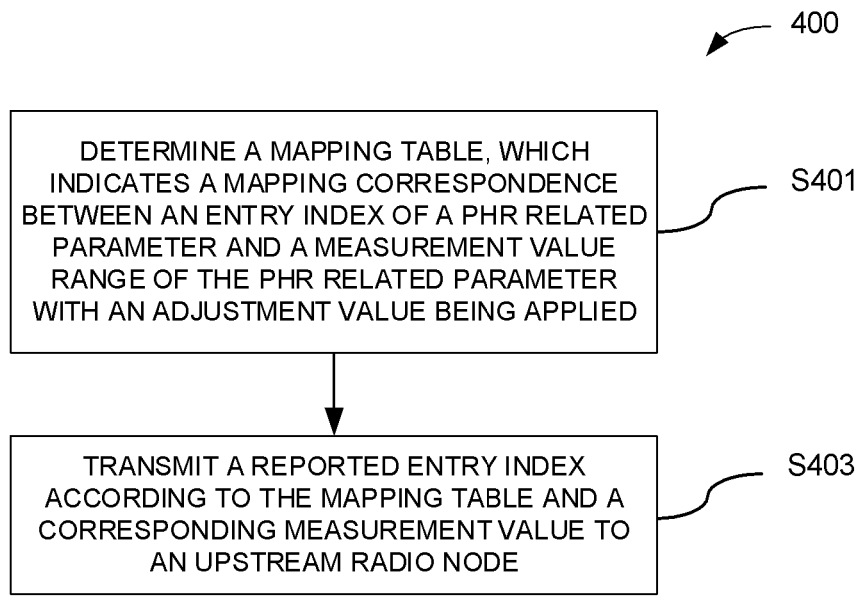
FIG. 4 is a flowchart illustrating a method at a downstream node for PHR according to an exemplary embodiment of the present disclosure.

FIG. 4 is a flowchart illustrating a method 400 for PHR according to an exemplary embodiment of the present disclosure. The method 400 may be performed at a downstream radio node.

As shown in FIG. 4, the method 400 for PHR includes steps S401 and S403.

In step S401, the downstream radio node determines a mapping table, which indicates a mapping correspondence between an entry index of a PHR related parameter and a measurement value range of the PHR related parameter with an adjustment value being applied.

The PHR related parameter includes at least one of a PH and a maximum transmit power for the downstream radio node.

In step S403, the downstream radio node transmits a reported entry index according to the mapping table and a corresponding measurement value to an upstream radio node. In an exemplary embodiment, the reported entry index is transmitted in a PHR MAC CE.

The PHR MAC CE may be constructed according to a defined PHR MAC CE format. In particular, the reported entry index for the PH may be placed in a field for PH in the PHR MAC CE for transmission, and the reported entry index for the maximum transmit power may be placed in a field for maximum transmit power field in the PHR MAC CE for transmission.

There may be two PHR MAC CE formats: single entry PHR and multiple entry PHR MAC CEs, which will be described in detail below.

For the single entry PHR MAC CE format, it has a fixed size and consists of two octet as shown in FIG. 2, and is defined as follows:

R: Reserved bit, set to "0";

PH: This field indicates the power headroom level. The length of the field is 6 bits;

$P_{CMAX,f,c}$: This field indicates the $P_{CMAX,f,c}$ (as specified in TS 38.213 [6]) used for calculation of the preceding PH field.

For the multiple entry PHR MAC CE format, the PHR MAC CEs as shown in FIGS. 3(a) and 3(b) are defined as follows:

Ci: This field indicates the presence of a PH field for the Serving Cell with ServCellIndex i as specified in TS 38.331 [5]. The Ci field set to "1" indicates that a PH field for the Serving Cell with ServCellIndex i is reported. The Ci field set to "0" indicates that a PH field for the Serving Cell with ServCellIndex i is not reported;

R: Reserved bit, set to "0";

V: This field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. For Type 3 PH, V=0 indicates real transmission on SRS and V=1 indicates that an SRS reference format is used. Furthermore, for Type 1, Type 2, and Type 3 PH, V=0 indicates the presence of the octet containing the associated $P_{CMAX,f,c}$ field, and V=1 indicates that the octet containing the associated $P_{CMAX,f,c}$ field is omitted;

PH: This field indicates the power headroom level. The length of the field is 6 bits. The reported PH and the corresponding power headroom levels are shown in Table 6.1.3.8-1 (the corresponding measured values in dB for the NR Serving Cell are specified in TS 38.133 [11] while the corresponding measured values in dB for the E-UTRA Serving Cell are specified in TS 36.133 [12]);

P: This field indicates whether the MAC entity applies power backoff due to power management. The MAC entity shall set P=1 if the corresponding $P_{CMAX,f,c}$ field would have had a different value if no power backoff due to power management had been applied;

$P_{CMAX,f,c}$: If present, this field indicates the $P_{CMAX,f,c}$ or $P_{CMAX,f,c}$ (as specified in TS 38.213 [6]) used for calculation of the preceding PH field.

In an exemplary embodiment, the adjustment value may be predefined. Alternatively, the adjustment value may be configured by the upstream radio node or a donor radio node, e.g., depending on link budget, link gain, capabilities of the downstream radio node on its transmission mode (e.g., MIMO, beamforming and antenna manufacturing etc.), capabilities of the upstream radio node on its reception mode (e.g., MIMO, beamforming and antenna manufacturing etc.) or the supported uplink power class etc.

The adjustment value may be one of:
- an offset of a measurement value of the PHR related parameter;
- a maximum value of a measurement value of the PHR related parameter;
- a minimum value of a measurement value of the PHR related parameter.

In an exemplary embodiment in which the adjustment value is an offset of a measurement value of the PHR related parameter, the offset may be applied to the existing mapping table for the PHR related parameter to form a new mapping table for the PHR related parameter. Here, the offset refers to an offset relative to the existing respective measurement value ranges of the PHR related parameter corresponding to the respective entry indexes of the PHR related parameter.

In an example that the PHR related parameter is PH, the offset for PH (denoted as "PH_offset") is applied to the existing Table 1 for PH Mapping as previously described to form a new PH mapping table—Table 3 below.

TABLE 3

PH Mapping with PH_offset

| Reported value | Measured quantity value (dB) |
| --- | --- |
| POWER_HEADROOM_0 | PH < −32 + PH_offset |
| POWER_HEADROOM_1 | −32 + PH_offset ≤ PH < −31 + PH_offset |
| POWER_HEADROOM_2 | −31 + PH_offset ≤ PH < −30 + PH_offset |
| POWER_HEADROOM_3 | −30 + PH_offset ≤ PH < −29 + PH_offset |
| ... | ... |
| POWER_HEADROOM_53 | 25 + PH_offset ≤ PH < 26 + PH_offset |
| POWER_HEADROOM_54 | 26 + PH_offset ≤ PH < 27 + PH_offset |
| POWER_HEADROOM_55 | 27 + PH_offset ≤ PH < 28 + PH_offset |
| POWER_HEADROOM_56 | 28 + PH_offset ≤ PH < 30 + PH_offset |
| POWER_HEADROOM_57 | 30 + PH_offset ≤ PH < 32 + PH_offset |
| POWER_HEADROOM_58 | 32 + PH_offset ≤ PH < 34 + PH_offset |
| POWER_HEADROOM_59 | 34 + PH_offset ≤ PH < 36 + PH_offset |
| POWER_HEADROOM_60 | 36 + PH_offset ≤ PH < 38 + PH_offset |
| POWER_HEADROOM_61 | 38 + PH_offset ≤ PH < 40 + PH_offset |
| POWER_HEADROOM_62 | 40 + PH_offset ≤ PH < 42 + PH_offset |
| POWER_HEADROOM_63 | PH ≥ 42 + PH_offset |

Similarly, in an example that the PHR related parameter is Maximum Transmit Power, the offset for Maximum Transmit Power (denoted as "$P_{CMAX,c,f}$_offset") is applied to the existing Table 2 for Maximum Transmit Power mapping as previously described to form a new Maximum Transmit Power mapping table—Table 4 below.

TABLE 4

Maximum Transmit Power ($P_{CMAX, c,f}$) Mapping with $P_{CMAX, c,f}$_offset

| Reported value | Measured quantity value | Unit |
| --- | --- | --- |
| PCMAX_C_00 | $P_{CMAX, c, f}$ < −29 + $P_{CMAX, c, f}$_offset | dBm |
| PCMAX_C_01 | −29 + $P_{CMAX, c, f}$_offset ≤ $P_{CMAX, c, f}$ < −28 + $P_{CMAX, c, f}$_offset | dBm |
| PCMAX_C_02 | −28 + $P_{CMAX, c, f}$_offset ≤ $P_{CMAX, c, f}$ < −27 + $P_{CMAX, c, f}$_offset | dBm |
| ... | ... | ... |
| PCMAX_C_61 | 31 + $P_{CMAX, c, f}$_offset ≤ $P_{CMAX, c, f}$ < 32 + $P_{CMAX, c, f}$_offset | dBm |
| PCMAX_C_62 | 32 + $P_{CMAX, c, f}$_offset ≤ $P_{CMAX, c, f}$ < 33 + $P_{CMAX, c, f}$_offset | dBm |
| PCMAX_C_63 | 33 + $P_{CMAX, c, f}$_offset ≤ $P_{CMAX, c, f}$ | dBm |

In an exemplary embodiment in which the adjustment value is maximum/minimum value of a measurement value of the PHR related parameter, a mapping table may be determined at least based on the maximum/minimum value and a granularity value.

The granularity value defines a size of a measurement value range corresponding to an entry index of the PHR related parameter. The granularity value may also be configured by the upstream radio node or a donor radio node or predefined.

In an exemplary embodiment, the measurement value range of the PHR related parameter with the maximum/minimum being applied is one of:

$$\begin{cases} (-\infty, \text{Min}), & \text{if } n = 0 \\ [\text{Min} + (n-1) * Gn, \text{Min} + n * Gn), & \text{if } n = 1 \sim (N-2) \\ [\text{Min} + (N-2) * Gn, +\infty), & \text{if } n = (N-1) \end{cases}$$

$$\begin{cases} (-\infty, \text{Max} - (N-2) * Gn), & \text{if } n = 0 \\ [\text{Max} - (N-n-1) * Gn, \text{Max} - (N-n-2) * Gn), & \text{if } n = 1 \sim (N-2) \\ [\text{Max} + \infty), & \text{if } n = (N-1) \end{cases}$$

wherein n denotes an entry index, N is a number of entry indexes and is an integer; Min denotes the minimum value; Max denotes the maximum value; and Gn denotes the granularity value corresponding to the entry index n.

In an exemplary embodiment, the granularity value may be a predetermined value.

In an exemplary embodiment, the predetermined granularity value may be a fixed value (e.g., 1).

Alternatively, the predetermined granularity value may be entry index specific, i.e., different for different entry index. For example, unequal granularity values may be applied to generate the mapping table in order to build a table with finer granularities on the frequently used region while with coarse-grained on less frequently used regions.

In another exemplary embodiment, the granularity value may be fixed and derived based on the number of the entry indexes, the minimum value and the maximum value. For example, G=(Max−Min)/(N−1), where G denotes the fixed value.

In the example that the PHR related parameter is PH, a PH mapping table with a PH maximum (denoted as "PH_max") and a granularity value applied to a measurement value range of PH may be shown in Table 5 below. In this example, the granularity value is exemplified to be 1 for any of the entry indexes, and the number of entry indexes is exemplified to be 64. It may be appreciated that 1 is only an example of the granularity value, and 64 is only an example of the number of entry indexes, which may be any other values as appropriate.

TABLE 5

PH mapping with PH_max

| Reported value | Measured quantity value (dB) |
|---|---|
| POWER_HEADROOM_0 | PH < PH_max − 62 |
| POWER_HEADROOM_1 | PH_max − 62 ≤ PH < PH_max − 61 |
| POWER_HEADROOM_2 | PH_max − 61 ≤ PH < PH_max − 60 |
| POWER_HEADROOM_3 | PH_max − 60 ≤ PH < PH_max − 61 |
| ... | ... |
| POWER_HEADROOM_53 | PH_max − 10 ≤ PH < PH_max − 9 |
| POWER_HEADROOM_54 | PH_max − 9 ≤ PH < PH_max − 8 |
| POWER_HEADROOM_55 | PH_max − 8 ≤ PH < PH_max − 7 |
| POWER_HEADROOM_56 | PH_max − 7 ≤ PH < PH_max − 6 |
| POWER_HEADROOM_57 | PH_max − 6 ≤ PH < PH_max − 5 |
| POWER_HEADROOM_58 | PH_max − 5 ≤ PH < PH_max − 4 |
| POWER_HEADROOM_59 | PH_max − 4 ≤ PH < PH_max − 3 |
| POWER_HEADROOM_60 | PH_max − 3 ≤ PH < PH_max − 2 |
| POWER_HEADROOM_61 | PH_max − 2 ≤ PH < PH_max − 1 |
| POWER_HEADROOM_62 | PH_max − 1 ≤ PH < PH_max |
| POWER_HEADROOM_63 | PH ≥ PH_max |

In the example that the PHR related parameter is PH, a PH mapping table with a PH minimum (denoted as "PH_min") applied to a measurement value range of PH may be shown in Table 6 below.

TABLE 6

PH mapping with PH_min

| Reported value | Measured quantity value (dB) |
|---|---|
| POWER_HEADROOM_0 | PH < PH_min |
| POWER_HEADROOM_1 | PH_min ≤ PH < PH_min + 1 |
| POWER_HEADROOM_2 | PH_min + 1 ≤ PH < PH_min + 2 |
| POWER_HEADROOM_3 | PH_min + 2 ≤ PH < PH_min + 3 |
| ... | ... |
| POWER_HEADROOM_53 | PH_min + 52 ≤ PH < PH_min + 53 |
| POWER_HEADROOM_54 | PH_min + 53 ≤ PH < PH_min + 54 |
| POWER_HEADROOM_55 | PH_min + 54 ≤ PH < PH_min + 55 |
| POWER_HEADROOM_56 | PH_min + 55 ≤ PH < PH_min + 56 |
| POWER_HEADROOM_57 | PH_min + 56 ≤ PH < PH_min + 57 |
| POWER_HEADROOM_58 | PH_min + 57 ≤ PH < PH_min + 58 |
| POWER_HEADROOM_59 | PH_min + 58 ≤ PH < PH_min + 59 |
| POWER_HEADROOM_60 | PH_min + 59 ≤ PH < PH_min + 60 |
| POWER_HEADROOM_61 | PH_min + 60 ≤ PH < PH_min + 61 |
| POWER_HEADROOM_62 | PH_min + 61 ≤ PH < PH_min + 62 |
| POWER_HEADROOM_63 | PH ≥ PH min + 62 |

Similarly, in the example that the PHR related parameter is Maximum Transmit Power, a Maximum Transmit Power mapping table with a maximum for Maximum Transmit Power (denoted as "$P_{CMAX,c,f}\_max$") applied to a measurement value range of Maximum Transmit Power may be shown in Table 7 below.

TABLE 7

Maximum Transmit Power ($P_{CMAX,\ c,f}$) Mapping with $P_{CMAX,\ c,f}\_max$

| Reported value | Measured quantity value | Unit |
|---|---|---|
| PCMAX_C_00 | $P_{CMAX,\ c,f} < P_{CMAX,\ c,f}\_max - 62$ | dBm |
| PCMAX_C_01 | $P_{CMAX,\ c,f}\_max - 62 \leq P_{CMAX,\ c,f} < P_{CMAX,\ c,f}\_max - 61$ | dBm |
| PCMAX_C_02 | $P_{CMAX,\ c,f}\_max - 61 \leq P_{CMAX,\ c,f} < P_{CMAX,\ c,f}\_max - 60$ | dBm |
| ... | ... | ... |
| PCMAX_C_61 | $P_{CMAX,\ c,f}\_max - 2 \leq P_{CMAX,\ c,f} < P_{CMAX,\ c,f}\_max - 1$ | dBm |
| PCMAX_C_62 | $P_{CMAX,\ c,f}\_max - 1 \leq P_{CMAX,\ c,f} < P_{CMAX,\ c,f}\_max$ | dBm |
| PCMAX_C_63 | $P_{CMAX,\ c,f} \geq P_{CMAX,\ c,f}\_max$ | dBm |

In the example that the PHR related parameter is Maximum Transmit Power, a Maximum Transmit Power mapping table with a minimum for Maximum Transmit Power (denoted as "$P_{CMAX,c,f}\_min$") applied to a measurement value range of Maximum Transmit Power may be shown in Table 8 below.

TABLE 8

Maximum Transmit Power ($P_{CMAX,\ c,f}$) Mapping with $P_{CMAX,\ c,f}\_min$

| Reported value | Measured quantity value | Unit |
|---|---|---|
| PCMAX_C_00 | $P_{CMAX,\ c,f} < P_{CMAX,\ c,f}\_min$ | dBm |
| PCMAX_C_01 | $PH\_min < P_{CMAX,\ c,f} < P_{CMAX,\ c,f}\_min + 1$ | dBm |
| PCMAX_C_02 | $PH\_min + 1 \leq P_{CMAX,\ c,f} < PH\_min + 2$ | dBm |
| ... | ... | ... |
| PCMAX_C_61 | $P_{CMAX,\ c,f}\_min + 60 \leq P_{CMAX,\ c,f} < P_{CMAX,\ c,f}\_min + 61$ | dBm |
| PCMAX_C_62 | $P_{CMAX,\ c,f}\_min + 61 \leq P_{CMAX,\ c,f} < P_{CMAX,\ c,f}\_min + 62$ | dBm |
| PCMAX_C_63 | $P_{CMAX,\ c,f} \geq P_{CMAX,\ c,f}\_min + 62$ | dBm |

In an exemplary embodiment, there may be a plurality of mapping tables for one PHR related parameter. In this case, the step S401 may include: determining one of the plurality of mapping tables to be used according to e.g., a maximum transmit power of the downstream radio node, or configuration from the upstream radio node or a donor radio node, or the type of the downstream radio node.

In an exemplary embodiment, after determining the mapping table to be used, the downstream radio node also transmits in step S403, to the upstream radio node, an indication of the determined mapping table for one of the PH and the maximum transmit power by R bits in the field for another of the PH and the maximum transmit power in the PHR MAC CE or in the MAC subheader. It should be noted that the transmission of the indication of the determined mapping table is alternative, since the upstream radio node may determine the mapping table used by the downstream radio node according to the same rule.

In an exemplary embodiment, there may be a plurality of mapping tables for one PHR related parameter, and each mapping table is corresponding to at least one of a plurality of granularity values. In this case, the method 400 further includes: selecting a granularity value from the plurality of granularity values. Accordingly, the step S403 further includes: transmitting, to the upstream radio node, an indication of the selected granularity value and/or its corresponding mapping table for one of the PH and the maximum transmit power by R bits in a field for another of the PH and the maximum transmit power in the PHR MAC CE or in the MAC subheader.

In an example, 1 or 2 R bits in the $P_{CMAX,c,f}$ field of the single/multiple entry PHR MAC CE may be configured to indicate which PH mapping table (or PH value granularity) is selected to be used if there are multiple PH value tables (or multiple PH value granularities) are available. In another example, R bits in the MAC subheader may be configured to indicate which PH mapping table (or PH value granularity) is selected to be used; and if there is no enough R bits, some bits from the length field in the MAC subheader may be configured to be reused. It should be noted that although an example for the PHR related parameter—PH is illustrated here, the same method may be applied to the PHR related parameter—the maximum transmit power.

In an exemplary embodiment, a field for one of the PH and the maximum transmit power in a PHR MAC CE is extended by incorporating at least one R bit from a field for another one of the PH and the maximum transmit power.

For example, the size of the PH field may be increased from 6 bits to more bits, such as 7 bits or 8 bits. In one example, one or two R bits from the $P_{CMAX,c,f}$ field combined with the original 6 bits to formulate the new PH field. In another example, P bit or V bit may be reused for the increased size of the PH field, in the case that the upstream radio node is already possible to be aware of/learn the value of P field or V field. It should be noted that although an example for the PHR related parameter—PH is illustrated here, the same method may be applied to the PHR related parameter—the maximum transmit power.

Figure 5:
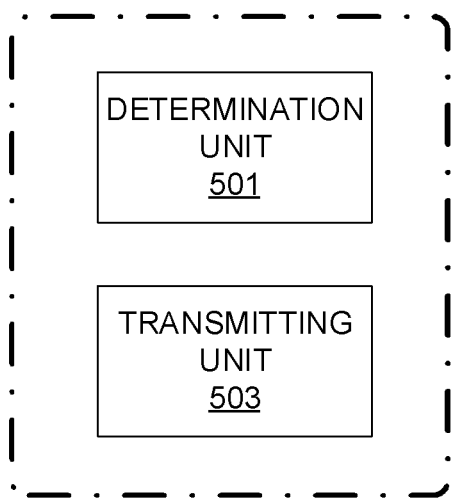
FIG. 5 is a block diagram of a downstream radio node according to an exemplary embodiment of the present disclosure.

Hereinafter, a structure of a downstream radio node according to an exemplary embodiment of the present disclosure will be described with reference to FIG. 5. FIG. 5 shows a block diagram of a downstream radio node 500 according to an exemplary embodiment of the present disclosure. The downstream radio node 500 in FIG. 5 may perform the method 400 for PHR as described previously with reference to FIG. 4. Accordingly, some detailed description on the downstream radio node 500 may refer to the corresponding description of the method 400 for PHR as previously discussed.

As shown in FIG. 5, the downstream radio node 500 includes:
a determination unit 501, configured to determine a mapping table, which indicates a mapping correspondence between an entry index of a PHR parameter and a measurement value range of the PHR related parameter with an adjustment value being applied; and
a transmitting unit 503, configured to transmit a reported entry index according to the mapping table and a corresponding measurement value to an upstream radio node.

In an exemplary embodiment, the transmitting unit 503 transmits the reported entry index in a PHR MAC CE.

In an exemplary embodiment, the PHR related parameter includes at least one of a PH and a maximum transmit power for the downstream radio node.

In an exemplary embodiment, the adjustment value may be configured by the upstream radio node or a donor radio node or predefined, and may be one of:
an offset of a measurement value of the PHR related parameter;
a maximum value of a measurement value of the PHR related parameter;
a minimum value of a measurement value of the PHR related parameter.

In a case that the adjustment value is the maximum or minimum value of the measurement value of the PHR related parameter, the determination unit 501 determines the mapping table at least based on the maximum or minimum value and a granularity value which is configured by the upstream radio node or a donor radio node or predefined.

In an exemplary embodiment, the measurement value range of the PHR related parameter with the adjustment value being applied is one of:

$$\begin{cases} (-\infty, \text{Min}), & \text{if } n = 0 \\ [\text{Min} + (n-1)*Gn, \text{Min} + n*Gn), & \text{if } n = 1 \sim (N-2) ; \\ [\text{Min} + (N-2)*Gn, +\infty), & \text{if } n = (N-1) \end{cases}$$

$$\begin{cases} (-\infty, \text{Max} - (N-2)*Gn), & \text{if } n = 0 \\ [\text{Max} - (N-n-1)*Gn, \text{Max} - (N-n-2)*Gn), & \text{if } n = 1 \sim (N-2) , \\ [\text{Max} + \infty), & \text{if } n = (N-1) \end{cases}$$

wherein n denotes an entry index, N is a number of entry indexes and is an integer; Min denotes the minimum value; Max denotes the maximum value; and Gn denotes the granularity value corresponding to the entry index n.

In an exemplary embodiment, the granularity value may be a predetermined value.

In an exemplary embodiment, the predefined granularity value may be fixed, or entry index specific, e.g., different for different entry indexes.

In another exemplary embodiment, the granularity value may be fixed and derived based on the number of the entry indexes, the minimum value and the maximum value. For example, G=(Max−Min)/(N−1), where G denotes the fixed value.

In an exemplary embodiment, in a case that there are a plurality of mapping tables for one PHR related parameter, the determination unit 501 determines one of the plurality of mapping tables to be used according to a maximum transmit power of the downstream radio node, or configuration from the upstream radio node or a donor radio node, or the type of the downstream radio node.

In an exemplary embodiment, after the determination unit 501 determines the mapping table to be used, the transmitting unit 503 transmits, to the upstream radio node, an indication of the determined mapping table for one of the PH and the maximum transmit power by reserved bits in a field for another of the PH and the maximum transmit power in a PHR MAC CE or in a MAC subheader.

In an exemplary embodiment, in a case that there are a plurality of mapping tables for one PHR related parameter and each mapping table is corresponding to at least one of a plurality of granularity values, the downstream radio node 500 further includes: a selection unit (not shown), configured to select a granularity value from the plurality of granularity values. Then, the transmitting unit 503 transmits, to the upstream radio node, an indication of the selected granularity value and/or its corresponding mapping table for one of the PH and the maximum transmit power by reserved bits in a field for another of the PH and the maximum transmit power in a PHR MAC CE or in a MAC subheader.

In an exemplary embodiment, a field for one of the PH and the maximum transmit power in a PHR MAC CE is extended by incorporating at least one reserved bit from a field for another one of the PH and the maximum transmit power.

As previously described, the downstream radio node may include a UE and/or a downstream IAB-N.

Figure 6:
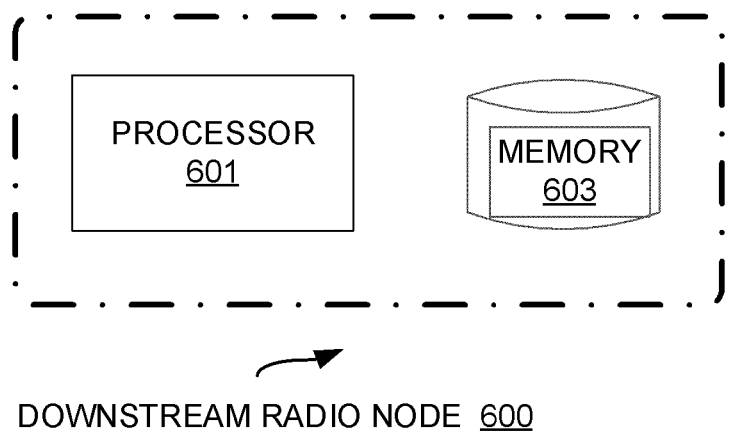
FIG. 6 is a block diagram of a downstream radio node according to another exemplary embodiment of the present disclosure.

Hereinafter, a structure of a downstream radio node according to another exemplary embodiment of the present disclosure will be described with reference to FIG. 6. FIG. 6 shows a block diagram of a downstream radio node 400 according to an exemplary embodiment of the present disclosure. The downstream radio node 600 in FIG. 6 may perform the method 600 for PHR as described previously with reference to FIG. 4. Accordingly, some detailed description on the downstream radio node 600 may refer to the corresponding description of the method 400 for PHR as previously discussed.

As shown in FIG. 6, the downstream radio node 600 includes at least one processor 601 and at least one memory 603. The at least one processor 601 includes e.g., any suitable CPU (Central Processing Unit), microcontroller, DSP (Digital Signal Processor), etc., capable of executing computer program instructions. The at least one memory 403 may be any combination of a RAM (Random Access Memory) and a ROM (Read Only Memory). The at least one processor memory 603 may also comprise persistent storage, which, for example, can be any single one or combination of magnetic memory, optical memory, or solid state memory or even remotely mounted memory.

The at least one memory 603 stores instructions executable by the at least one processor 601, whereby the downstream radio node 600 is operative to perform the actions, e.g., of the procedures as described earlier respectively in conjunction with FIG. 4.

In particular, in an embodiment of causing the downstream radio node 600 to perform the actions of the procedure as described earlier respectively in conjunction with FIG. 4, the instructions, when loaded from the at least one memory 603 and executed on the at least one processor 601, may cause the downstream radio node 600 to determine, in step S401, a mapping table which indicates a mapping correspondence between an entry index of a PHR related parameter and a measurement value range of the PHR related parameter with an adjustment value being applied.

The instructions, when loaded from the at least one memory 603 and executed on the at least one processor 601, may further cause the downstream radio node 600 to transmit, in step S403, a reported entry index according to the mapping table and a corresponding measurement value to an upstream radio node.

In an exemplary embodiment, the instructions, when executed by the at least one processor 601, cause the downstream radio node 600 to transmit the reported entry index in a PHR MAC CE.

In an exemplary embodiment, the PHR related parameter includes at least one of a PH and a maximum transmit power for the downstream radio node.

In an exemplary embodiment, the adjustment value may be configured by the upstream radio node or a donor radio node or predefined, and may be one of:
an offset of a measurement value of the PHR related parameter;
a maximum value of a measurement value of the PHR related parameter;
a minimum value of a measurement value of the PHR related parameter.

In a case that the adjustment value is the maximum or minimum value of the measurement value of the PHR related parameter, the instructions, when executed by the at least one processor 601, cause the downstream radio node 600 to determine the mapping table at least based on the maximum or minimum value and a granularity value which is configured by the upstream radio node or a donor radio node or predefined.

In an exemplary embodiment, the measurement value range of the PHR related parameter with the adjustment value being applied is one of:

$$\begin{cases} (-\infty, \text{Min}), & \text{if } n = 0 \\ [\text{Min} + (n-1)*Gn, \text{Min} + n*Gn), & \text{if } n = 1 \sim (N-2) \ ; \\ [\text{Min} + (N-2)*Gn, +\infty), & \text{if } n = (N-1) \end{cases}$$

$$\begin{cases} (-\infty, \text{Max} - (N-2)*Gn), & \text{if } n = 0 \\ [\text{Max} - (N-n-1)*Gn, \text{Max} - (N-n-2)*Gn), & \text{if } n = 1 \sim (N-2) \ , \\ [\text{Max} + \infty), & \text{if } n = (N-1) \end{cases}$$

wherein n denotes an entry index, N is a number of entry indexes and is an integer; Min denotes the minimum value; Max denotes the maximum value; and Gn denotes the granularity value corresponding to the entry index n.

In an exemplary embodiment, the granularity value may be a predetermined value.

In an exemplary embodiment, the predefined granularity value may be fixed (e.g., 1), or entry index specific, e.g., different for different entry indexes.

In another exemplary embodiment, the granularity value may be fixed and derived based on the number of the entry indexes, the minimum value and the maximum value. For example, G=(Max−Min)/(N−1), where G denotes the fixed value.

In an exemplary embodiment, in a case that there are a plurality of mapping tables for one PHR related parameter, the instructions, when executed by the at least one processor 601, cause the downstream radio node 600 to determine one of the plurality of mapping tables to be used according to a maximum transmit power of the downstream radio node, or configuration from the upstream radio node or a donor radio node, or the type of the downstream radio node.

In an exemplary embodiment, after determining the mapping table to be used, the instructions, when executed by the at least one processor 601, cause the downstream radio node 600 to transmit, to the upstream radio node, an indication of the determined mapping table for one of the PH and the maximum transmit power by reserved bits in a field for another of the PH and the maximum transmit power in a PHR MAC CE or in a MAC subheader.

In an exemplary embodiment, in a case that there are a plurality of mapping tables for one PHR related parameter and each mapping table is corresponding to at least one of a plurality of granularity values, the instructions, when executed by the at least one processor 601, cause the downstream radio node 600 to select a granularity value from the plurality of granularity values; and transmit, to the upstream radio node, an indication of the selected granularity value and/or its corresponding mapping table for one of the PH and the maximum transmit power by reserved bits in a field for another of the PH and the maximum transmit power in a PHR MAC CE or in a MAC subheader.

In an exemplary embodiment, a field for one of the PH and the maximum transmit power in a PHR MAC CE is extended by incorporating at least one reserved bit from a field for another one of the PH and the maximum transmit power.

As previously described, the downstream radio node may include a UE and/or a downstream IAB-N.

Hereinafter, a method at an upstream radio node for receiving a PHR according to an exemplary embodiment of the present disclosure will be described with reference to FIG. 7.

Figure 7:
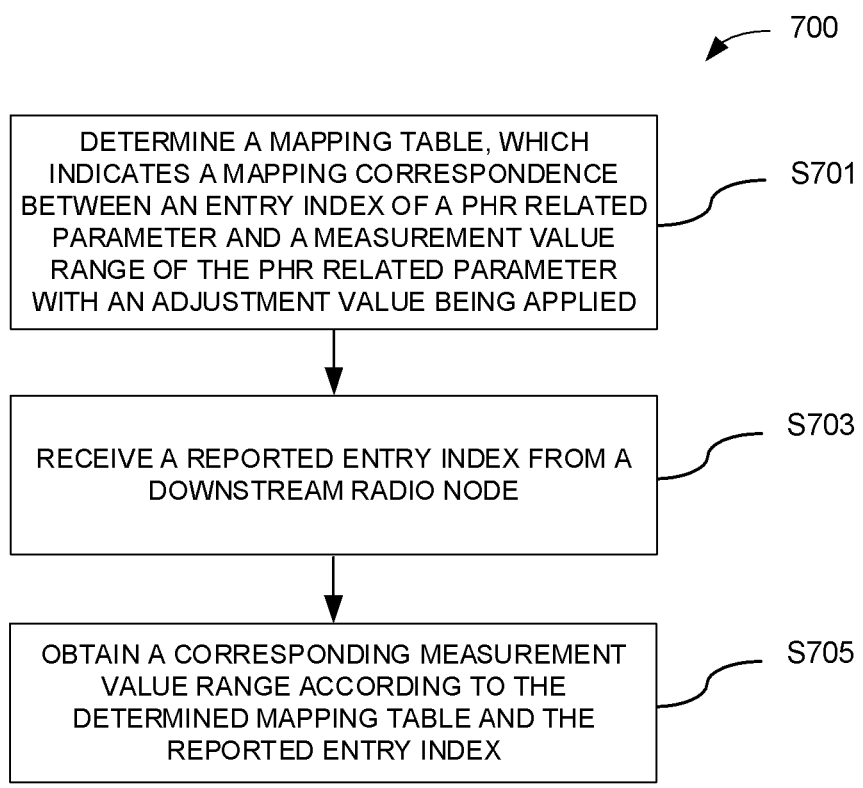
FIG. 7 is a flowchart illustrating a method at an upstream radio node for receiving a PHR according to an exemplary embodiment of the present disclosure.

FIG. 7 is a flowchart illustrating a method 700 for receiving a PHR according to an exemplary embodiment of the present disclosure. The method 700 may be performed at an upstream radio node.

As shown in FIG. 7, the method 700 for PHR includes steps S701, S703 and S705.

In step S701, the upstream radio node determines a mapping table, which indicates a mapping correspondence between an entry index of a PHR related parameter and a measurement value range of the PHR related parameter with an adjustment value being applied.

In step S703, the upstream radio node receives a reported entry index from a downstream radio node. As previously described, the reported entry index is received in a PHR MAC CE.

In step S705, the upstream radio node obtains a corresponding measurement value range according to the determined mapping table and the reported entry index.

The PHR related parameter includes at least one of a PH and a maximum transmit power for the downstream radio node.

In an exemplary embodiment, the adjustment value may be predefined. Alternatively, the adjustment value may be configured by the upstream radio node or a donor radio node, e.g., depending on link budget, link gain, capabilities of the downstream radio node on its transmission mode (e.g., MIMO, beamforming, and antenna manufacturing etc.), capabilities of the upstream radio node on its reception mode (e.g., MIMO, beamforming and antenna manufacturing etc.), or the supported uplink power class etc.

The adjustment value may be one of:
an offset of a measurement value of the PHR related parameter;
a maximum value of a measurement value of the PHR related parameter;
a minimum value of a measurement value of the PHR related parameter.

In an exemplary embodiment in which the adjustment value is an offset of a measurement value of the PHR related parameter, the offset may be applied to the existing mapping table for the PHR related parameter to form a new mapping table for the PHR related parameter. The detailed description may refer to the corresponding part as described in the method 400 with reference to FIG. 4.

In an exemplary embodiment in which the adjustment value is maximum/minimum value of a measurement value of the PHR related parameter, a mapping table may be determined at least based on the maximum/minimum value and a granularity value. The detailed description may refer to the corresponding part as described in the method 400 with reference to FIG. 4.

The granularity value may also be configured by the upstream radio node or a donor radio node or predefined.

In an exemplary embodiment, the measurement value range of the PHR related parameter with the maximum/minimum being applied is one of:

$$\begin{cases} (-\infty, \text{Min}), & \text{if } n = 0 \\ [\text{Min} + (n-1)*Gn, \text{Min} + n*Gn), & \text{if } n = 1 \sim (N-2); \\ [\text{Min} + (N-2)*Gn, +\infty), & \text{if } n = (N-1) \end{cases}$$

$$\begin{cases} (-\infty, \text{Max} - (N-2)*Gn), & \text{if } n = 0 \\ [\text{Max} - (N-n-1)*Gn, \text{Max} - (N-n-2)*Gn), & \text{if } n = 1 \sim (N-2), \\ [\text{Max} + \infty), & \text{if } n = (N-1) \end{cases}$$

wherein n denotes an entry index, N is a number of entry indexes and is an integer; Min denotes the minimum value; Max denotes the maximum value; and Gn denotes the granularity value corresponding to the entry index n.

In an exemplary embodiment, the granularity value may be a predetermined value.

In an exemplary embodiment, the predetermined granularity value may be a fixed value (e.g., 1).

Alternatively, the predetermined granularity value may be entry index specific, i.e., different for different entry index. For example, unequal granularity values may be applied to generate the mapping table in order to build a table with finer granularities on the frequently used region while with coarse-grained on less frequently used regions.

In another exemplary embodiment, the granularity value may be fixed and derived based on the number of the entry indexes, the minimum value and the maximum value. For example, G=(Max−Min)/(N−1), where G denotes the fixed value.

In an exemplary embodiment, there may be a plurality of mapping tables for one PHR related parameter. In this case, the step S701 may include: determining one of the plurality of mapping tables to be used according to e.g., a maximum transmit power of the downstream radio node, or configuration from the upstream radio node or a donor radio node, or the type of the downstream radio node, i.e., the same rule as used in the downstream radio node.

In another exemplary embodiment, the step S703 further includes: receiving, from the downstream radio node, an indication of the mapping table for one of the PH and the maximum transmit power determined by the downstream radio node, which is indicated by reserved bits in a field for another of the PH and the maximum transmit power in a PHR MAC CE or in a MAC subheader. In this case, the upstream radio node determines the mapping table used by the downstream radio node by the indication from the downstream radio node.

In an exemplary embodiment, there may be a plurality of mapping tables for one PHR related parameter, and each mapping table is corresponding to at least one of a plurality of granularity values. In this case, the step S703 further includes: receiving, from the downstream radio node, an indication of the granularity value and/or its corresponding mapping table for one of the PH and the maximum transmit power determined by the downstream radio node, which is indicated by reserved bits in a field for another of the PH and the maximum transmit power in a PHR MAC CE or in a MAC subheader.

In an exemplary embodiment, a field for one of the PH and the maximum transmit power in a PHR MAC CE is extended by incorporating at least one reserved bit from a field for another one of the PH and the maximum transmit power.

Figure 8:
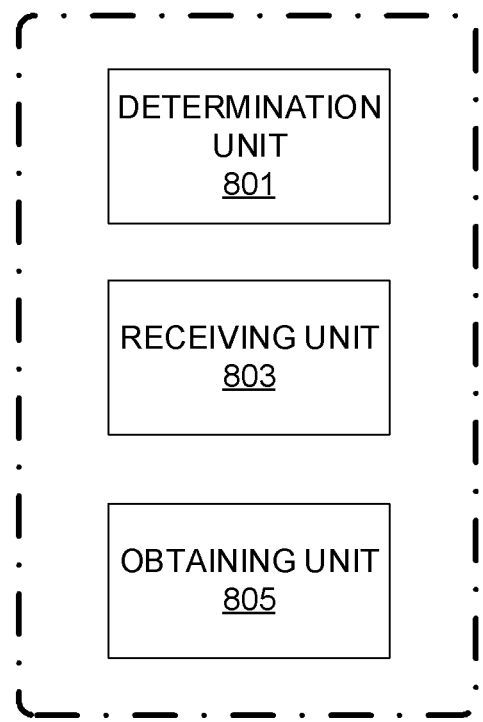
FIG. 8 is a block diagram of an upstream radio node according to an exemplary embodiment of the present disclosure.

Hereinafter, a structure of an upstream radio node according to an exemplary embodiment of the present disclosure will be described with reference to FIG. 8. FIG. 8 shows a block diagram of an upstream radio node 800 according to an exemplary embodiment of the present disclosure. The upstream radio node 800 in FIG. 8 may perform the method 700 for receiving a PHR as described previously with reference to FIG. 7. Accordingly, some detailed description on the upstream radio node 800 may refer to the corresponding description of the method 700 for receiving a PHR as previously discussed.

As shown in FIG. 8, the upstream radio node 800 includes:

- a determination unit 801, configured to determine a mapping table, which indicates a mapping correspondence between an entry index of a PHR related parameter and a measurement value range of the PHR related parameter with an adjustment value being applied;
- a receiving unit 803, configured to receive a reported entry index from a downstream radio node; and
- an obtaining unit 805, configured to obtain a corresponding measurement value range according to the determined mapping table and the reported entry index.

In an exemplary embodiment, the receiving unit 803 receives the reported entry index in a PHR MAC CE.

In an exemplary embodiment, the PHR related parameter includes at least one of a PH and a maximum transmit power for the downstream radio node.

In an exemplary embodiment, the adjustment value may be configured by the upstream radio node or a donor radio node or predefined, and may be one of:

- an offset of a measurement value of the PHR related parameter;
- a maximum value of a measurement value of the PHR related parameter;
- a minimum value of a measurement value of the PHR related parameter.

In a case that the adjustment value is the maximum or minimum value of the measurement value of the PHR related parameter, the determination unit 801 determines the mapping table at least based on the maximum or minimum value and a granularity value which is configured by the upstream radio node or a donor radio node or predefined.

In an exemplary embodiment, the measurement value range of the PHR related parameter with the adjustment value being applied is one of:

$$\begin{cases} (-\infty, \text{Min}), & \text{if } n = 0 \\ [\text{Min} + (n-1)*Gn, \text{Min} + n*Gn), & \text{if } n = 1 \sim (N-2); \\ [\text{Min} + (N-2)*Gn, +\infty), & \text{if } n = (N-1) \end{cases}$$

$$\begin{cases} (-\infty, \text{Max} - (N-2)*Gn), & \text{if } n = 0 \\ [\text{Max} - (N-n-1)*Gn, \text{Max} - (N-n-2)*Gn), & \text{if } n = 1 \sim (N-2), \\ [\text{Max} + \infty), & \text{if } n = (N-1) \end{cases}$$

wherein n denotes an entry index, N is a number of entry indexes and is an integer; Min denotes the minimum value; Max denotes the maximum value; and Gn denotes the granularity value corresponding to the entry index n.

In an exemplary embodiment, the granularity value may be a predetermined value.

In an exemplary embodiment, the predefined granularity value may be fixed, or entry index specific, e.g., different for different entry indexes.

In another exemplary embodiment, the granularity value may be fixed and derived based on the number of the entry indexes, the minimum value and the maximum value. For example, G=(Max−Min)/(N−1), where G denotes the fixed value.

In an exemplary embodiment, in a case that there are a plurality of mapping tables for one PHR related parameter, the determination unit 801 determines one of the plurality of mapping tables to be used according to a maximum transmit power of the downstream radio node, or configuration from the upstream radio node or a donor radio node, or the type of the downstream radio node, i.e., the same rule as used in the downstream radio node.

In an exemplary embodiment, the receiving unit 803 receives, from the downstream radio node, an indication of the mapping table for one of the PH and the maximum transmit power determined by the downstream radio node, which is indicated by reserved bits in a field for another of the PH and the maximum transmit power in a PHR MAC CE or in a MAC subheader. Then, the obtaining unit 805 obtains the corresponding measurement value range according to the determined mapping table and the reported entry index.

In an exemplary embodiment, in a case that there are a plurality of mapping tables for one PHR related parameter and each mapping table is corresponding to at least one of a plurality of granularity values, the receiving unit 803 receives, from the downstream radio node, an indication of the granularity value and/or its corresponding mapping table for one of the PH and the maximum transmit power determined by the downstream radio node, which is indicated by reserved bits in a field for another of the PH and the maximum transmit power in a PHR MAC CE or in a MAC subheader.

In an exemplary embodiment, a field for one of the PH and the maximum transmit power in a PHR MAC CE is extended by incorporating at least one reserved bit from a field for another one of the PH and the maximum transmit power.

Figure 9:
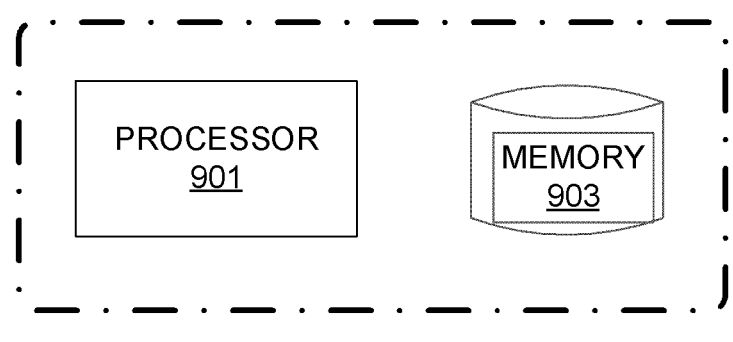
FIG. 9 is a block diagram of an upstream radio node according to another exemplary embodiment of the present disclosure.

Hereinafter, a structure of an upstream radio node according to another exemplary embodiment of the present disclosure will be described with reference to FIG. 9. FIG. 9 shows a block diagram of an upstream radio node 900 according to an exemplary embodiment of the present disclosure. The upstream radio node 900 in FIG. 9 may perform the method 700 for receiving a PHR as described previously with reference to FIG. 7. Accordingly, some detailed description on the upstream radio node 900 may refer to the corresponding description of the method 700 for receiving the PHR as previously discussed.

As shown in FIG. 9, the upstream radio node 900 includes at least one processor 901 and at least one memory 903. The at least one processor 901 includes e.g., any suitable CPU (Central Processing Unit), microcontroller, DSP (Digital Signal Processor), etc., capable of executing computer program instructions. The at least one memory 903 may be any combination of a RAM (Random Access Memory) and a ROM (Read Only Memory). The at least one processor memory 903 may also comprise persistent storage, which, for example, can be any single one or combination of magnetic memory, optical memory, or solid state memory or even remotely mounted memory.

The at least one memory 903 stores instructions executable by the at least one processor 901, whereby the upstream radio node 900 is operative to perform the actions, e.g., of the procedures as described earlier respectively in conjunction with FIG. 7.

In particular, in an embodiment of causing the upstream radio node 900 to perform the actions of the procedure as described earlier respectively in conjunction with FIG. 7, the instructions, when loaded from the at least one memory 903 and executed on the at least one processor 901, may cause the upstream radio node 700 to determine, in step S501, a mapping table which indicates a mapping correspondence between an entry index of a PHR related parameter and a measurement value range of the PHR related parameter with an adjustment value being applied.

The instructions, when loaded from the at least one memory 903 and executed on the at least one processor 901, may further cause the upstream radio node 900 to receive, in step S703, a reported entry index from a downstream radio node.

The instructions, when loaded from the at least one memory 903 and executed on the at least one processor 901, may further cause the upstream radio node 900 to obtain, in step S705, a corresponding measurement value range according to the determined mapping table and the reported entry index.

In an exemplary embodiment, the reported entry index is received in a PHR MAC CE.

In an exemplary embodiment, the PHR related parameter includes at least one of a PH and a maximum transmit power for the downstream radio node.

In an exemplary embodiment, the adjustment value may be configured by the upstream radio node or a donor radio node or predefined, and may be one of:
- an offset of a measurement value of the PHR related parameter;
- a maximum value of a measurement value of the PHR related parameter;
- a minimum value of a measurement value of the PHR related parameter.

In a case that the adjustment value is the maximum or minimum value of the measurement value of the PHR related parameter, the instructions, when executed by the at least one processor 901, cause the upstream radio node 900 to determine the mapping table at least based on the maximum or minimum value and a granularity value which is configured by the upstream radio node or a donor radio node or predefined.

In an exemplary embodiment, the measurement value range of the PHR related parameter with the adjustment value being applied is one of:

$$\begin{cases} (-\infty, \text{Min}), & \text{if } n = 0 \\ [\text{Min} + (n-1)*Gn, \text{Min} + n*Gn), & \text{if } n = 1 \sim (N-2) ; \\ [\text{Min} + (N-2)*Gn, +\infty), & \text{if } n = (N-1) \end{cases}$$

$$\begin{cases} (-\infty, \text{Max} - (N-2)*Gn), & \text{if } n = 0 \\ [\text{Max} - (N-n-1)*Gn, \text{Max} - (N-n-2)*Gn), & \text{if } n = 1 \sim (N-2) , \\ [\text{Max} + \infty), & \text{if } n = (N-1) \end{cases}$$

wherein n denotes an entry index, N is a number of entry indexes and is an integer; Min denotes the minimum value; Max denotes the maximum value; and Gn denotes the granularity value corresponding to the entry index n.

In an exemplary embodiment, the granularity value may be a predetermined value.

In an exemplary embodiment, the predefined granularity value may be fixed, or entry index specific, e.g., different for different entry indexes.

In another exemplary embodiment, the granularity value may be fixed and derived based on the number of the entry indexes, the minimum value and the maximum value. For example, G=(Max−Min)/(N−1), where G denotes the fixed value.

In an exemplary embodiment, in a case that there are a plurality of mapping tables for one PHR related parameter, the instructions, when executed by the at least one processor 901, cause the upstream radio node 900 to determine one of the plurality of mapping tables to be used according to a maximum transmit power of the downstream radio node, or configuration from the upstream radio node or a donor radio node, or the type of the downstream radio node, i.e., the same rule as used in the downstream radio node.

In an exemplary embodiment, the instructions, when executed by the at least one processor 901, cause the upstream radio node 900 to receive, from the downstream radio node, an indication of the mapping table for one of the PH and the maximum transmit power determined by the downstream radio node, which is indicated by reserved bits in a field for another of the PH and the maximum transmit power in a PHR MAC CE or in a MAC subheader; and obtain the corresponding measurement value range according to the determined mapping table and the reported entry index.

In an exemplary embodiment, in a case that there are a plurality of mapping tables for one PHR related parameter and each mapping table is corresponding to at least one of a plurality of granularity values, the instructions, when executed by the at least one processor 901, cause the upstream radio node 900 to receive, from the downstream radio node, an indication of the granularity value and/or its corresponding mapping table for one of the PH and the maximum transmit power determined by the downstream radio node, which is indicated by reserved bits in a field for another of the PH and the maximum transmit power in a PHR MAC CE or in a MAC subheader.

In an exemplary embodiment, a field for one of the PH and the maximum transmit power in a PHR MAC CE is extended by incorporating at least one reserved bit from a field for another one of the PH and the maximum transmit power.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the at least one processor 601 causes the downstream radio node 600 to perform the actions, e.g., of the procedure described earlier in conjunction with FIG. 4; or code/computer readable instructions, which when executed by the at least one processor 901 causes the downstream radio node 900 to perform the actions, e.g., of the procedures described earlier respectively in conjunction with FIG. 6.

The computer program product may be configured as a computer program code structured in computer program modules. The computer program modules could essentially perform the actions of the flow illustrated in FIG. 4 or 7.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 10:
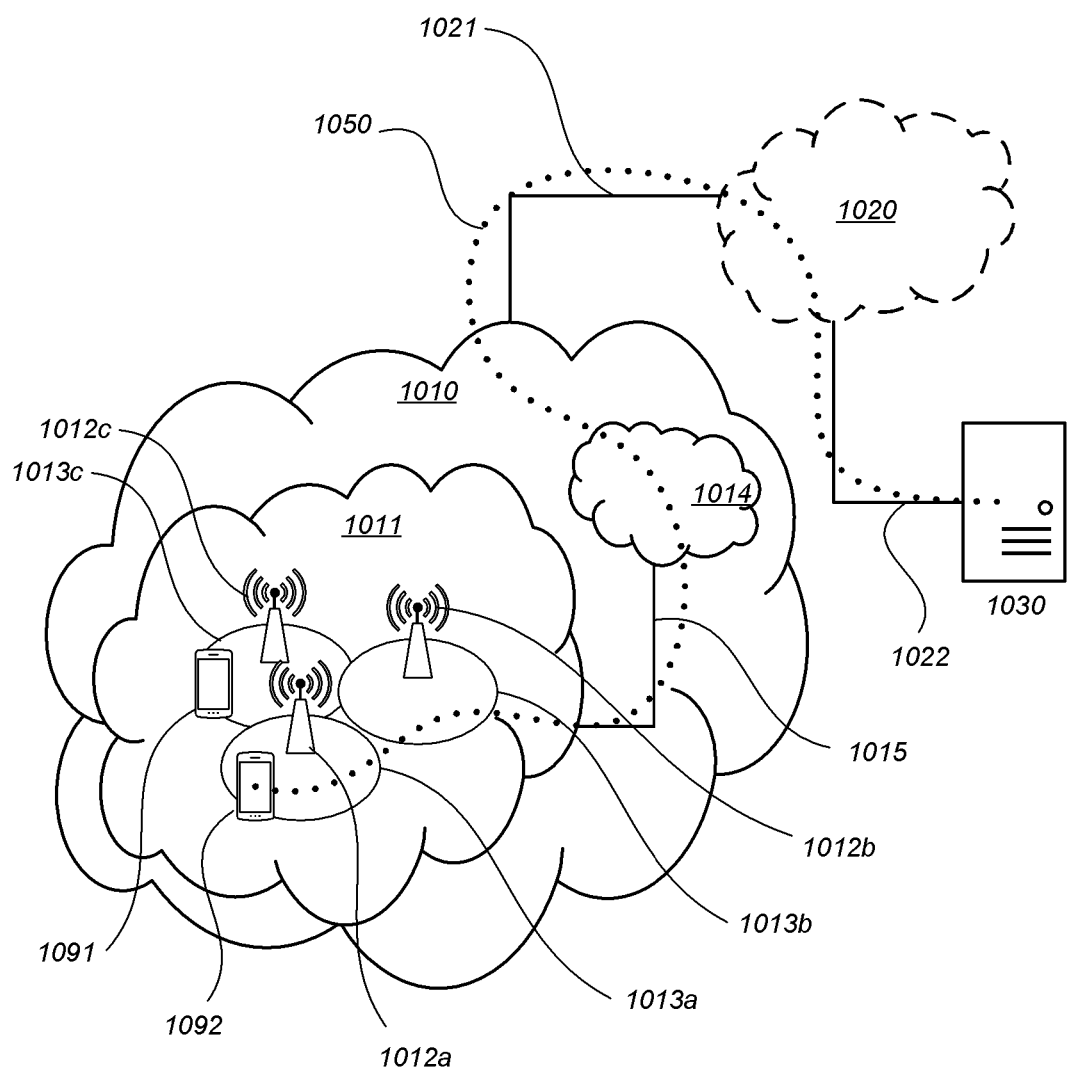
FIG. 10 schematically illustrates a telecommunication network connected via an intermediate network to a host computer.

With reference to FIG. 10, in accordance with an embodiment, a communication system includes a telecommunication network 1010, such as a 3GPP-type cellular network, which comprises an access network 1011, such as a radio access network, and a core network 1014. The access network 1011 comprises a plurality of base stations 1012*a*, 1012*b*, 1012*c*, such as NBs, eNBs, gNBs or other types of wireless access points, each defining a corresponding coverage area 1013*a*, 1013*b*, 1013*c*. Each base station 1012*a*, 1012*b*, 1012*c* is connectable to the core network 1014 over a wired or wireless connection 1015. A first user equipment (UE) 1091 located in coverage area 1013*c* is configured to wirelessly connect to, or be paged by, the corresponding base station 1012*c*. A second UE 1092 in coverage area 1013*a* is wirelessly connectable to the corresponding base station 1012*a*. While a plurality of UEs 1091, 1092 are illustrated in this example, the disclosed embodiments are equally applicable to a situation where a sole UE is in the coverage area or where a sole UE is connecting to the corresponding base station 1012.

The telecommunication network 1010 is itself connected to a host computer 1030, which may be embodied in the hardware and/or software of a standalone server, a cloud-implemented server, a distributed server or as processing resources in a server farm. The host computer 1030 may be under the ownership or control of a service provider, or may be operated by the service provider or on behalf of the service provider. The connections 1021, 1022 between the telecommunication network 1010 and the host computer 1030 may extend directly from the core network 1014 to the host computer 1030 or may go via an optional intermediate network 1020. The intermediate network 1020 may be one of, or a combination of more than one of, a public, private or hosted network; the intermediate network 1020, if any, may be a backbone network or the Internet; in particular, the intermediate network 1020 may comprise two or more sub-networks (not shown).

The communication system of FIG. 10 as a whole enables connectivity between one of the connected UEs 1091, 1092 and the host computer 1030. The connectivity may be described as an over-the-top (OTT) connection 1050. The host computer 1030 and the connected UEs 1091, 1092 are configured to communicate data and/or signaling via the OTT connection 1050, using the access network 1011, the core network 1014, any intermediate network 1020 and possible further infrastructure (not shown) as intermediaries. The OTT connection 1050 may be transparent in the sense that the participating communication devices through which the OTT connection 1050 passes are unaware of routing of uplink and downlink communications. For example, a base station 1012 may not or need not be informed about the past routing of an incoming downlink communication with data originating from a host computer 1030 to be forwarded (e.g., handed over) to a connected UE 1091. Similarly, the base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11. In a communication system 1100, a host computer 1110 comprises hardware 1115 including a communication interface 1116 configured to set up and maintain a wired or wireless connection with an interface of a different communication device of the communication system 1100. The host computer 1110 further comprises processing circuitry 1118, which may have storage and/or processing capabilities. In particular, the processing circuitry 1118 may comprise one or more programmable processors, application-specific integrated circuits, field programmable gate arrays or combinations of these (not shown) adapted to execute instructions. The host computer 1110 further comprises software 1111, which is stored in or accessible by the host computer 1110 and executable by the processing circuitry 1118. The software 1111 includes a host application 1112. The host application 1112 may be operable to provide a service to a remote user, such as a UE 1130 connecting via an OTT connection 1150 terminating at the UE 1130 and the host computer 1110. In providing the service to the remote user, the host application 1112 may provide user data which is transmitted using the OTT connection 1150.

The communication system 1100 further includes a base station 1120 provided in a telecommunication system and comprising hardware 1125 enabling it to communicate with the host computer 1110 and with the UE 1130. The hardware 1125 may include a communication interface 1126 for setting up and maintaining a wired or wireless connection with an interface of a different communication device of the communication system 1100, as well as a radio interface 1127 for setting up and maintaining at least a wireless connection 1170 with a UE 1130 located in a coverage area (not shown in FIG. 11) served by the base station 1120. The communication interface 1126 may be configured to facilitate a connection 1160 to the host computer 1110. The connection 1160 may be direct or it may pass through a core network (not shown in FIG. 11) of the telecommunication system and/or through one or more intermediate networks outside the telecommunication system. In the embodiment shown, the hardware 1125 of the base station 1120 further includes processing circuitry 1128, which may comprise one or more programmable processors, application-specific integrated circuits, field programmable gate arrays or combinations of these (not shown) adapted to execute instructions. The base station 1120 further has software 1121 stored internally or accessible via an external connection.

The communication system 1100 further includes the UE 1130 already referred to. Its hardware 1135 may include a radio interface 1137 configured to set up and maintain a wireless connection 1170 with a base station serving a coverage area in which the UE 1130 is currently located. The hardware 1135 of the UE 1130 further includes processing circuitry 1138, which may comprise one or more programmable processors, application-specific integrated circuits, field programmable gate arrays or combinations of these (not shown) adapted to execute instructions. The UE 1130 further comprises software 1131, which is stored in or accessible by the UE 1130 and executable by the processing circuitry 1138. The software 1131 includes a client application 1132. The client application 1132 may be operable to provide a service to a human or non-human user via the UE 1130, with the support of the host computer 1110. In the host computer 1110, an executing host application 1112 may communicate with the executing client application 1132 via the OTT connection 1150 terminating at the UE 1130 and the host computer 1110. In providing the service to the user, the client application 1132 may receive request data from the host application 1112 and provide user data in response to the request data. The OTT connection 1150 may transfer both the request data and the user data. The client application 1132 may interact with the user to generate the user data that it provides.

Figure 11:
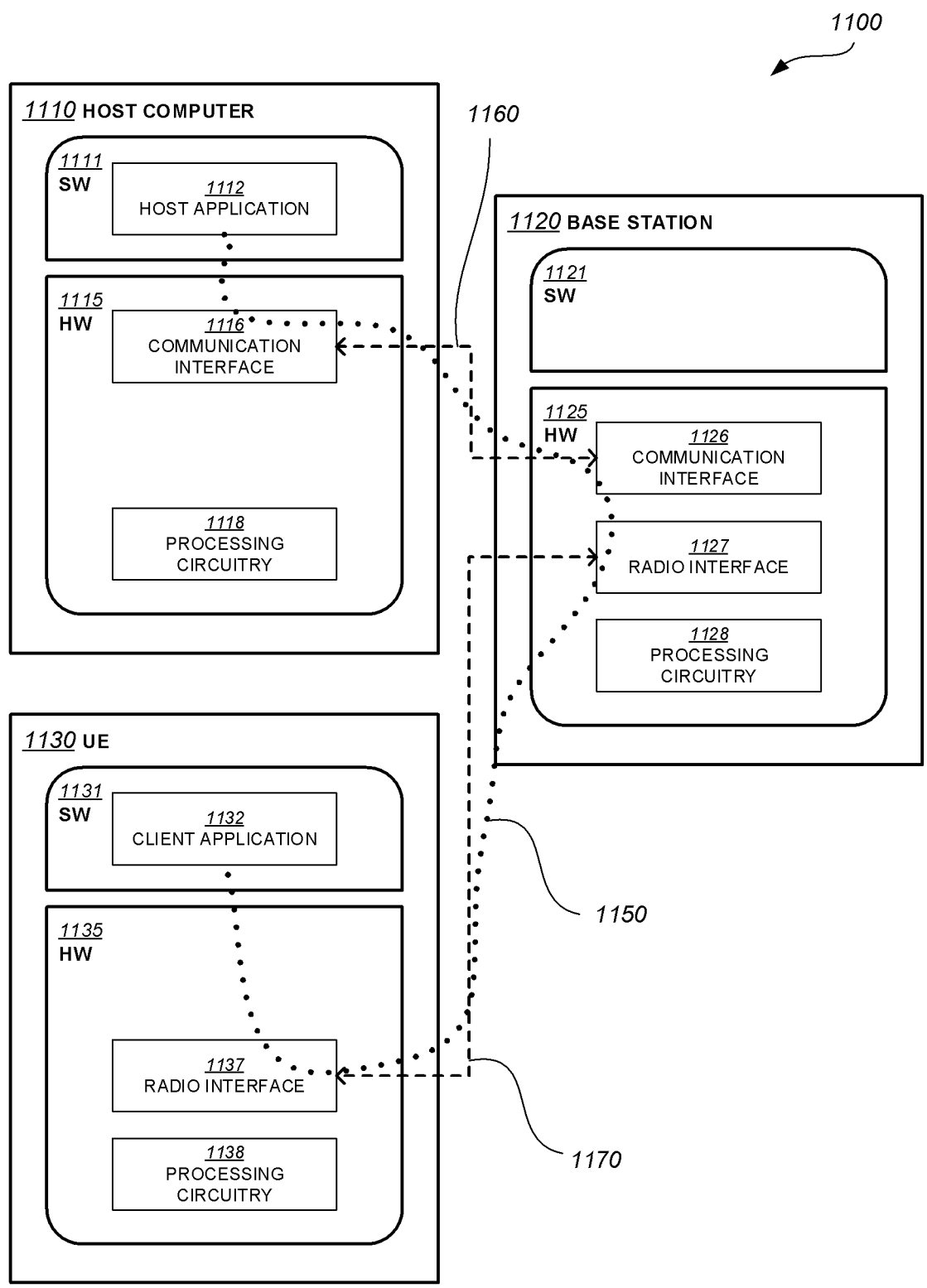
FIG. 11 is a generalized block diagram of a host computer communicating via a base station with a UE over a partially wireless connection.

It is noted that the host computer 1110, base station 1120 and UE 1130 illustrated in FIG. 11 may be identical to the host computer 830, one of the base stations 812*a*, 812*b*, 812*c* and one of the UEs 8111, 8112 of FIG. 8, respectively. This is to say, the inner workings of these entities may be as shown in FIG. 11 and independently, the surrounding network topology may be that of FIG. 8.

In FIG. 11, the OTT connection 1150 has been drawn abstractly to illustrate the communication between the host computer 1110 and the use equipment 1130 via the base station 1120, without explicit reference to any intermediary devices and the precise routing of messages via these devices. Network infrastructure may determine the routing, which it may be configured to hide from the UE 1130 or from the service provider operating the host computer 1110, or both. While the OTT connection 1150 is active, the network infrastructure may further take decisions by which it dynamically changes the routing (e.g., on the basis of load balancing consideration or reconfiguration of the network).

The wireless connection 1170 between the UE 1130 and the base station 1120 is in accordance with the teachings of the embodiments described throughout this disclosure. One or more of the various embodiments improve the performance of OTT services provided to the UE 1130 using the OTT connection 1150, in which the wireless connection 1170 forms the last segment. More precisely, the teachings of these embodiments may reduce PDCCH detection time and complexity and thereby provide benefits such as reduced user waiting time and reduced power consumption at the UE.

A measurement procedure may be provided for the purpose of monitoring data rate, latency and other factors on which the one or more embodiments improve. There may further be an optional network functionality for reconfiguring the OTT connection 1150 between the host computer 1110 and UE 1130, in response to variations in the measurement results. The measurement procedure and/or the network functionality for reconfiguring the OTT connection 1150 may be implemented in the software 1111 of the host computer 1110 or in the software 1131 of the UE 1130, or both. In embodiments, sensors (not shown) may be deployed in or in association with communication devices through which the OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of the OTT connection 1150 may include message format, retransmission settings, preferred routing etc.; the reconfiguring need not affect the base station 1120, and it may be unknown or imperceptible to the base station 1120. Such procedures and functionalities may be known and practiced in the art. In certain embodiments, measurements may involve proprietary UE signaling facilitating the host computer's 1110 measurements of throughput, propagation times, latency and the like. The measurements may be implemented in that the software 1111, 1131 causes messages to be transmitted, in particular empty or 'dummy' messages, using the OTT connection 1150 while it monitors propagation times, errors etc.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 1210 of the method, the host computer provides user data. In an optional substep 1211 of the first step 1210, the host computer provides the user data by executing a host application. In a second step 1220, the host computer initiates a transmission carrying the user data to the UE. In an optional third step 1230, the base station transmits to the UE the user data which was carried in the transmission that the host computer initiated, in accordance with the teachings of the embodiments described throughout this disclosure. In an optional fourth step 1240, the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 1310 of the method, the host computer provides user data. In an optional substep (not shown) the host computer provides the user data by executing a host application. In a second step 1320, the host computer initiates a transmission carrying the user data to the UE. The transmission may pass via the base station, in accordance with the teachings of the embodiments described throughout this disclosure. In an optional third step 1330, the UE receives the user data carried in the transmission.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 1410 of the method, the UE receives input data provided by the host computer. Additionally or alternatively, in an optional second step 1420, the UE provides user data. In an optional substep 1421 of the second step 1420, the UE provides the user data by executing a client application. In a further optional substep 1411 of the first step 1410, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1430, transmission of the user data to the host computer. In a fourth step 1440 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 1510 of the method, in accordance with the teachings of the embodiments described throughout this disclosure, the base station receives user data from the UE. In an optional second step 1520, the base station initiates transmission of the received user data to the host computer. In a third step 1530, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method at a downstream radio node, comprising:
   determining a mapping table, which indicates a mapping correspondence between an entry index of a Power Headroom Report (PHR) related parameter and a measurement value range of the PHR related parameter with an adjustment value being applied, the adjustment value being an offset of a measurement value of the PHR related parameter, the adjustment value being based at least in part on a granularity value of the measurement value range corresponding to the entry index, the granularity value being one of a preferred value and a value derived from a number of entry indices; and
   transmitting a reported entry index according to the mapping table and a corresponding measurement value to an upstream radio node.

2. The method according to claim 1, wherein in a case that the adjustment value is a minimum value of the measurement value of the PHR related parameter, said determining the mapping table comprises:
   determining the mapping table at least based on the minimum value and the granularity value.

3. The method according to claim 1, wherein in a case that there are a plurality of mapping tables for one PHR related parameter, said determining the mapping table comprises:
   determining one of the plurality of mapping tables to be used according to at least one of a maximum transmit power of the downstream radio node, a configuration from the upstream radio node or a donor radio node, and a type of the downstream radio node.

4. The method according to claim 3, further comprising:
   indicating, to the upstream radio node, the determined mapping table for one of a power headroom (PH) and a maximum transmit power by reserved bits in a field for another of the PH and a maximum transmit power in a PHR medium access control (MAC) control element (CE) or in a MAC subheader.

5. The method according to claim 1, wherein in a case that there are a plurality of mapping tables for one PHR related parameter and each mapping table is corresponding to at least one of a plurality of granularity values, the method further comprises:
   selecting a granularity value from the plurality of granularity values; and
   indicating, to the upstream radio node, one of the selected granularity value and a corresponding mapping table for one of a power headroom (PH) and a maximum transmit power by reserved bits in a field for another of the PH and a maximum transmit power in a PHR medium access control (MAC) control element (CE) or in a MAC subheader.

6. The method according to claim 1, wherein a field for one of a power headroom (PH) and a maximum transmit power in a PHR medium access control (MAC) control element (CE) is extended by incorporating at least one reserved bit from a field for another one of the PH and the maximum transmit power.

7. A downstream radio node, comprising:
   at least one processor, and
   at least one memory, storing instructions which, when executed on the at least one processor, cause the at least one processor to:
   determine a mapping table, which indicates a mapping correspondence between an entry index of a Power Headroom Report (PHR) related parameter and a measurement value range of the PHR related parameter with an adjustment value being applied, the adjustment value being an offset of a measurement value of the PHR related parameter, the adjustment value being based at least in part on a granularity value of the measurement value range corresponding to the entry index, the granularity value being one of a preferred value and a value derived from a number of entry indices; and
   transmit a reported entry index according to the mapping table and a corresponding measurement value to an upstream radio node.

8. A method at an upstream radio node, comprising:
   determining a mapping table, which indicates a mapping correspondence between an entry index of a Power Headroom Report (PHR) related parameter and a measurement value range of the PHR related parameter with an adjustment value being applied, the adjustment value being an offset of a measurement value of the PHR related parameter, the adjustment value being based at least in part on a granularity value of the measurement value range corresponding to the entry index, the granularity value being one of a preferred value and a value derived from a number of entry indices;
   receiving a reported entry index from a downstream radio node; and
   obtaining a corresponding measurement value range according to the determined mapping table and the reported entry index.

9. The method according to claim 8, wherein in a case that the adjustment value is a minimum value of the measurement value of the PHR related parameter, said determining the mapping table comprises:

determining the mapping table at least based on the minimum value and the granularity value.

10. The method according to claim 8, wherein in a case that there are a plurality of mapping tables for one PHR related parameter, said determining the mapping table comprises:

determining one of the plurality of mapping tables to be used according to at least one of a maximum transmit power of the downstream radio node, a configuration from the upstream radio node or a donor radio node, and a type of the downstream radio node.

11. The method according to claim 10, further comprising:

receiving, from the downstream radio node, an indication of the mapping table for one of a power headroom (PH) and the maximum transmit power determined by the downstream radio node, which is indicated by reserved bits in a field for another of the PH and a maximum transmit power in a PHR medium access control (MAC) control element (CE) or in a MAC subheader.

12. The method according to claim 8, wherein in a case that there are a plurality of mapping tables for one PHR related parameter and each mapping table corresponds to at least one of a plurality of granularity values, the method further comprises:

receiving, from the downstream radio node, an indication of the granularity value a corresponding mapping table for one of a power headroom (PH) and the maximum transmit power determined by the downstream radio node, which is indicated by reserved bits in a field for another of the PH and a maximum transmit power in a PHR medium access control (MAC) control element (CE) or in a MAC subheader.

13. The method according to claim 8, wherein a field for one of a power headroom (PH) and a maximum transmit power in a PHR medium access control (MAC) control element (CE) is extended by incorporating at least one reserved bit from a field for another one of the PH and the maximum transmit power.

\* \* \* \* \*